United States Patent
Sugawara

(10) Patent No.: US 6,231,193 B1
(45) Date of Patent: May 15, 2001

(54) LIGHT SOURCE DEVICE, ILLUMINATING SYSTEM AND IMAGE PROJECTING APPARATUS

(75) Inventor: Saburo Sugawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/031,771

(22) Filed: Feb. 27, 1998

(30) Foreign Application Priority Data

Feb. 27, 1997 (JP) ................................ 9-043510
Jul. 29, 1997 (JP) ................................ 9-218180

(51) Int. Cl.⁷ .......................................... G03B 21/14

(52) U.S. Cl. .............................. 353/102; 362/335

(58) Field of Search ..................... 353/102, 100, 353/97, 38; 362/335, 268, 308; 385/33–35, 51, 93, 94, 133, 146, 901

(56) References Cited

U.S. PATENT DOCUMENTS

| | | | |
|---|---|---|---|
| 3,600,568 | * 8/1971 | Weyauch | 353/102 |
| 3,702,395 | 11/1972 | Rosendahl | 353/102 |
| 4,918,583 | 4/1990 | Kudo et al. | 362/268 |
| 4,988,172 | 1/1991 | Kanamori et al. | |
| 5,014,166 | * 5/1991 | Draper et al. | 362/309 |
| 5,040,882 | * 8/1991 | Markle | 359/727 |
| 5,059,013 | * 10/1991 | Jain | 359/503 |
| 5,092,672 | * 3/1992 | Vanderwerf | 353/102 |
| 5,103,381 | 4/1992 | Uke | 362/32 |
| 5,206,759 | * 4/1993 | Ono et al. | 359/434 |
| 5,257,134 | 10/1993 | Sugawara | 359/679 |
| 5,303,001 | * 4/1994 | Jeong et al. | 355/53 |
| 5,303,088 | 4/1994 | Sugawara | 359/753 |
| 5,440,429 | 8/1995 | Kim | 359/649 |
| 5,491,525 | * 2/1996 | Yamasaki et al. | 353/98 |

(List continued on next page.)

FOREIGN PATENT DOCUMENTS

| | | |
|---|---|---|
| 969 367 | 5/1958 | (DE) . |
| 0 438 910 | 7/1991 | (EP) . |
| 0 449 804 | 10/1991 | (EP) . |
| 0 518 362 | 12/1992 | (EP) . |
| 0 603 583 | 6/1994 | (EP) . |
| 1095763 | 6/1955 | (FR) . |
| 60-7413 | 1/1985 | (JP) . |
| 3-180829 | 8/1991 | (JP) . |
| 4-60538 | 2/1992 | (JP) . |
| 8-22035 | 1/1996 | (JP) . |
| 9-10173 | 1/1997 | (JP) . |
| 9-43562 | 2/1997 | (JP) . |

OTHER PUBLICATIONS

Partial Translation and Abstract of Japanese Laid–Open Patent Application No. 8–22035.
Patent Abstracts of Japan, vol. 97, No. 6 (JP 9–43562, Feb. 14, 1997), Jun. 30, 1997.
Patent Abstracts of Japan, vol. 97, No. 5 (JP 9–10173, Jan. 14, 1997), May 30, 1997.
Patent Abstracts of Japan, vol. 9, No. 122 (P–359) (JP 60–7413, Jan. 16, 1985), May 28, 1985.
Patent Abstracts of Japan, vol. 15, No. 433 (P–1271), (JP 3–180829, Nov. 5, 1991), Aug. 6, 1991.

*Primary Examiner*—William Dowling
(74) *Attorney, Agent, or Firm*—Fitzpatrick, Cella, Harper & Scinto

(57) ABSTRACT

This specification discloses a light source device having a light source and condensing means for converging the light from the light source, the condensing means being provided with a meniscus lens convex toward the light source side in the optical path of the convergent light. The specification also discloses an illuminating system having such light source device and an irradiating optical system for applying a light beam from the light source device to a surface to be illuminated. The specification further discloses an image projecting apparatus having such illuminating system, image forming means such as a liquid crystal panel illuminated by the illuminating system, and a projection lens for projecting the image of the image forming means.

59 Claims, 18 Drawing Sheets

U.S. PATENT DOCUMENTS

| | | | |
|---|---|---|---|
| 5,497,049 | * | 3/1996 | Fischer .................................. 313/634 |
| 5,550,679 | | 8/1996 | Sugawara ............................. 359/689 |
| 5,552,938 | | 9/1996 | Sugawara ............................. 359/691 |
| 5,600,490 | | 2/1997 | Sugawara et al. ................... 359/690 |
| 5,625,738 | * | 4/1997 | Magarill ............................... 385/146 |
| 5,634,704 | | 6/1997 | Shikama et al. ....................... 353/31 |
| 5,777,804 | * | 7/1998 | Nakamura et al. .................... 353/98 |
| 5,781,349 | | 7/1998 | Sugawara ............................. 359/691 |
| 5,786,874 | * | 7/1998 | Kawamoto et al. ..................... 349/8 |
| 5,795,049 | * | 8/1998 | Gleckman ............................ 353/122 |
| 5,868,481 | * | 2/1999 | Conner et al. ........................ 353/102 |
| 5,870,225 | * | 2/1999 | Ogino et al. .......................... 359/457 |
| 5,980,046 | * | 11/1999 | Park ..................................... 353/102 |
| 6,018,214 | * | 1/2000 | DeVaan ................................. 353/20 |

\* cited by examiner

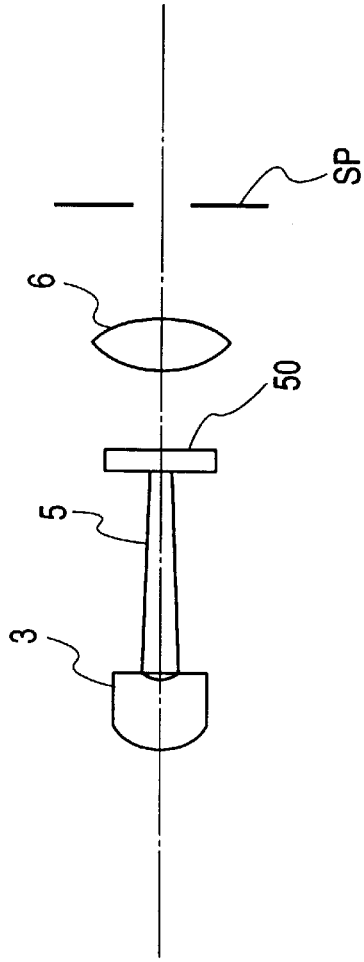
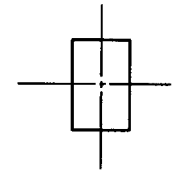
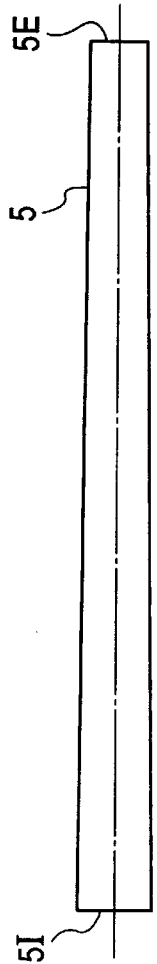
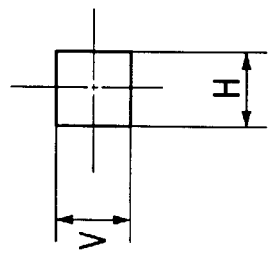

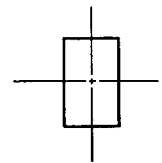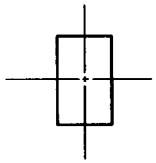
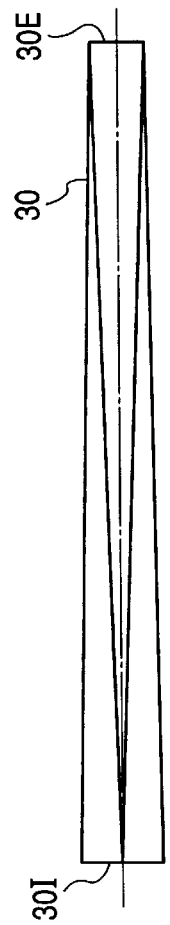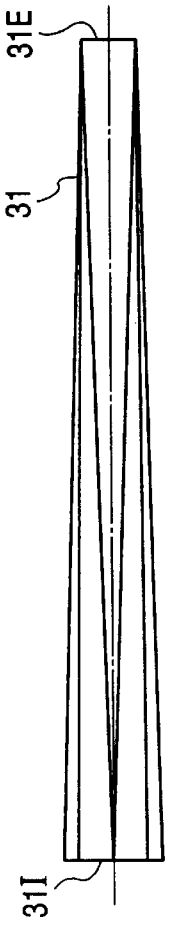
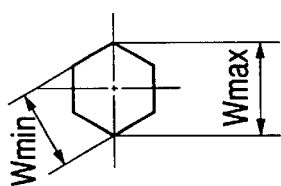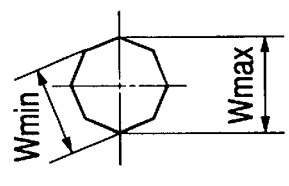

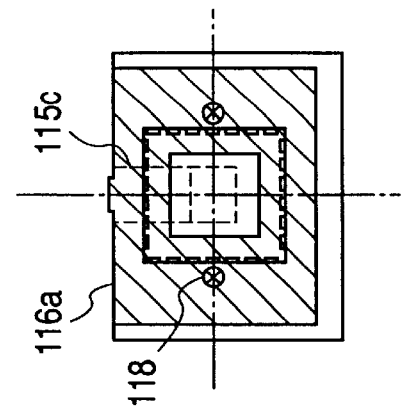
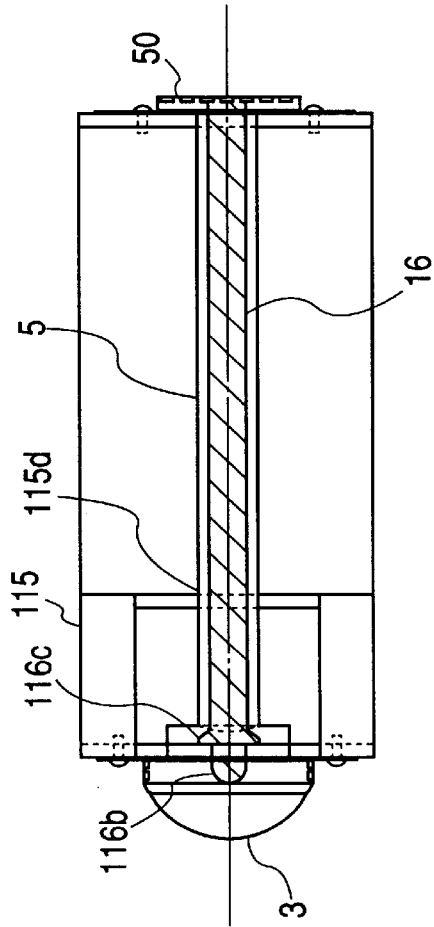
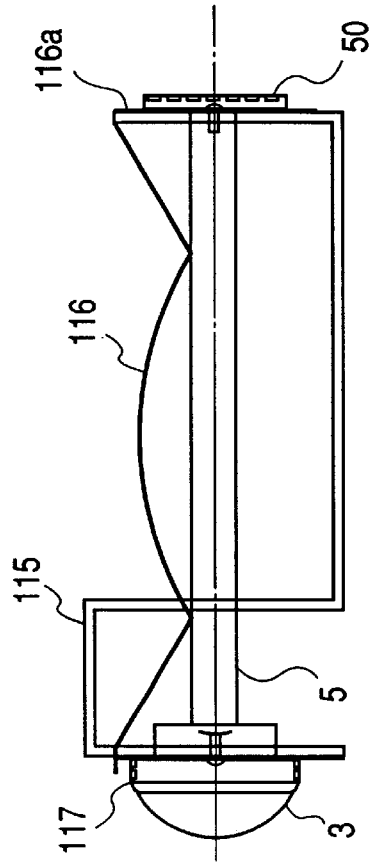
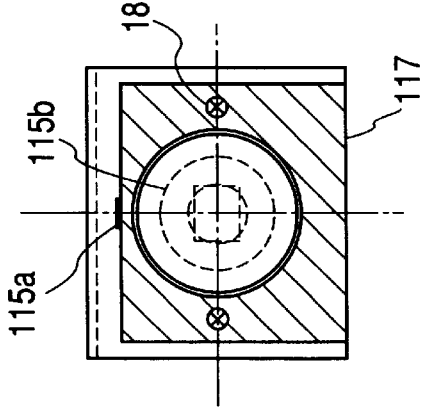

LIGHT SOURCE DEVICE, ILLUMINATING SYSTEM AND IMAGE PROJECTING APPARATUS

BACKGROUND OF THE INVENTION

1. Field of the Invention

This invention relates to a light source device, an illuminating system and an image projecting apparatus such as a liquid crystal projector, and particularly to a light source device, an illuminating system and an image projecting apparatus suitable when use is made of a light source of which the position of the light emitting portion fluctuates in a direction intersecting with an optical axis or a light source of which the light emitting portion in a direction intersecting with an optical axis is enlarged.

2. Related Background Art

In the light source device of a liquid crystal projector or the like, a system comprising an elliptical mirror, a parabolic surface mirror and a positive lens, and a system comprising a spherical mirror and a positive lens have heretofore been used when it is necessary to form a light source image. On the other hand, in recent years, a light source such as a high pressure mercury lamp in which the dimension of the light emitting portion of a light source is small has been developed to heighten the illuminating efficiency, and it is conceived to apply it to a light source device of this kind.

However, in the high pressure mercury lamp wherein the dimension of the light emitting portion of a light source is small, there frequently occurs a phenomenon called the arc jump that when the lamp is being turned on, the position of the light emitting portion fluctuates in an arc in a direction intersecting with an optical axis. Accordingly, when one of the above-mentioned various imaging systems such as an elliptical mirror is used as a condensing device, the light source image also moves in a direction intersecting with the optical axis in conformity with the fluctuation of the position of the light emitting portion of the light source. Therefore, when the opening portion of an optical system at a subsequent stage for receiving the light source image (for example, the light incidence surface of a glass rod integrator) is as small as the light source image as in the conventional art, there has been the problem that the light source image protrudes from the opening portion and the quantity of light entering the optical system is reduced and fluctuates.

This phenomenon will now be described in detail with an elliptical mirror taken as an example. When as shown in FIG. 10 of the accompanying drawings, a point light source (light emitting portion) 1 is disposed at a first focal point F1 (on the optical axis A) of an elliptical mirror 2, the light from the point light source 1 is converged by the elliptical mirror 2 and the image of the point light source 1 is formed at a second focal point F2 (on the optical axis A) of the elliptical mirror 2, but when as shown in FIG. 11 of the accompanying drawings, the point light source 1 is moved in a direction perpendicular to the optical axis A of the elliptical mirror 2 (hereinafter referred to as the "perpendicular direction"), rays of light k90a and k90b emitted in the perpendicular direction from the point light source 1 are condensed at the second focal point F2 of the elliptical mirror 2, while rays of light k50a and k50b emitted in a direction near the central portion of the elliptical mirror 2 (near the optical axis A) are converged and condensed at a position moved from the optical axis A in a direction opposite to the direction of movement of the point light source 1 and form a light source image, and rays of light k130a and k130b emitted toward the peripheral portion of the elliptical mirror 2 are converged and condensed at a position moved from the optical axis A in the same direction as the direction of movement of the point light source 1 and form a light source image.

As regards the amounts of movement of the light source images, the amount of movement 130d of the secondary light source image by the rays of light k130a and k130b emitted toward the peripheral portion of the elliptical mirror 2 is smaller than the amount of movement 50d by the rays of light k50a and k50b emitted in the direction near the central portion of the elliptical mirror 2. The reason for this is that the ratio between the distance between the point light source 1 (first focal point F1) and the reflecting position on the elliptical mirror 2 and the distance between the light source image (second focal point F2) and the reflecting position on the elliptical mirror 2 is greater for the rays of light k50a and k50b emitted in the direction near the central portion of the elliptical mirror 2 than for the rays of light k130a and k130b.

That is, in the case of the elliptical mirror 2, it has the characteristic that if the reflecting position on the reflecting surface thereof differs, the imaging magnification differs, and the imaging magnification becomes greater on the central portion of the elliptical mirror. Accordingly, when the opening portion (such as an opening of a slit or a stop) of an optical system at a subsequent stage is small, rays of light emitted off the optical axis and reflected near the center of the elliptical mirror are eclipsed and cannot be introduced into the opening portion and thus, the light from the light source cannot be utilized efficiently.

Such a problem is also considered to arise when any other imaging system than the elliptical mirror is used or when use is made of a light source of which the light emitting portion in a direction intersecting with the optical axis is enlarged.

SUMMARY OF THE INVENTION

It is the object of the present invention to provide a light source device, an illuminating system and an image projecting apparatus which can make the utilization efficiency of light good.

A form of the light source device of the present invention has an imaging optical system for forming the image of a light source, and correcting means for decreasing the expause of the image of the light source by the displacement and/or the expause of the light emitting portion of the light source. This correcting means has a meniscus lens convex toward the light source side, and the meniscus lens is characterized in that it is provided in the optical path of convergent light by the imaging optical system.

Another form of the light source device of the present invention has a light source and condensing means for converging light from the light source, and the condensing means is characterized by the provision of a meniscus lens convex toward the light source side in the optical path of the convergent light. The condensing means of this light source device forms the image of the light source, and particularly the meniscus lens is characterized in that it is positioned near the image of the light source.

The condensing means or the imaging optical system has a form in which it is provided with an elliptical mirror, a light source is disposed at a first focal point of the elliptical mirror and the image of the light source is formed at a second focal point of the elliptical mirror, a form in which it is provided with a parabolic surface mirror and a positive lens for condensing light from the parabolic surface mirror, a light source is disposed at the focal point position of the parabolic surface mirror and the image of the light source is formed at the focal point position of the positive lens, or a form in which it is provided with a spherical mirror and a positive lens for condensing light from the spherical mirror, a light source is disposed at the central position of the curvature of the spherical mirror, one conjugate point of the positive lens is set at the central position of the curvature of the spherical mirror and the image of the light source is formed at the other conjugate point of the positive lens.

Further there is a form in which it has a bar-like integrator on or near the light incidence surface of which is formed the image of the light source, the light from the image of the light source is caused to enter the interior of the bar-like integrator and the light is directed to the light emergence surface of the bar-like integrator while being reflected in the interior of the bar-like integrator, thereby forming a surface light source of which the intensity distribution is uniformized on the light emergence surface.

The shape of a cross-section orthogonal to the optical axis of the bar-like integrator is a polygon, and the shape of this cross-section is set to a square or a hexagon in accordance with the shape of a surface to be illuminated. Also, the bar-like integrator is comprised of bar-like glass, a kaleidoscope or the like.

The meniscus lens is preferably designed to satisfy the following conditional expressions:

$$0.5 < D1/R1 < 2$$

$$0.2 < R2/R1 < 2,$$

where R1 represents the radius of curvature of that lens surface of the meniscus lens which is adjacent to the light source, R2 represents the radius of curvature of that lens surface of the meniscus lens which is opposite to the light source, and D1 represents the on-axis thickness of the meniscus lens.

The meniscus lens is more preferably designed to satisfy the following conditions:

$$0.65 < D1/R1 < 1.6$$

$$0.3 < R2/R1 < 1.4$$

In the present invention, a high pressure mercury lamp can be used as the light source.

Also, the effective and simplest construction is a construction provided with only one meniscus lens. The side of the meniscus lens may be of a cylindrical shape or a conical shape gradually increasing in diameter toward the light source side. An aspherical lens in which at least one of the two lens surfaces of a meniscus lens is comprised of an aspherical surface can also be adopted.

There is not only a form in which the image of the light source is formed outside the meniscus lens, but also a form in which the image of the light source is formed in the interior of the meniscus lens.

The illuminating system of the present invention is characterized in that it has the light source device and an irradiating optical system for applying the light beam from the light source device to a surface to be illuminated, the light source device has a bar-like integrator on or near the light incidence surface of which is formed the image of the light source, and when the light from the image of the light source is caused to enter the interior of the bar-like integrator and the light is directed to the light emergence surface of the bar-like integrator while being reflected in the interior of the bar-like integrator, thereby forming a plane light source of which intensity distribution is uniformized on the light emergence surface, the irradiating optical system images the light emergence surface of the integrator on or near the surface to be illuminated.

Another aspect of the illuminating system of the present invention has an imaging optical system for forming the image of a light source on or near the light incidence portion of a bar-like integrator or an optical system, and the light incidence portion of the bar-like integrator or the optical system has a cross-sectional area equal to or larger than the expause of the image of the light source by the displacement or expause of the light emitting portion of the light source.

Still another aspect of the illuminating system of the present invention has a pair of transparent members mounted on the pair of end surfaces of a bar-like integrator each of the transparent members being larger in cross-sectional area than the corresponding end surface, the bar-like integrator being supported by these transparent members. There is a preferred form in which a meniscus lens convex toward the light source side is used as the transparent member on one of the pair of end surfaces which is adjacent to the light incidence side, and according to this preferred form, the expause of the image of the light source by the displacement or expause of the light emitting portion of the light source can be made small or be eliminated by the meniscus lens.

Also, yet still another aspect of the illuminating system of the present invention has a bar-like integrator in which the cross-sectional area of a light incidence surface on which the light from a light source is incident is larger than the cross-sectional area of a light emergence surface from which the light emerges. In this illuminating system, usually the light from the light source is condensed on or near the light incidence surface of the bar-like integrator by a condensing optical system, and this condensed light propagates through the interior of the bar-like integrator.

A preferred aspect of the illuminating system of the present invention has an irradiating optical system for applying the light beam from the bar-like integrator to a surface to be irradiated, and usually this irradiating optical system images the light emergence surface of a bar-like integrator on or near the surface to be irradiated. For the light intensity distribution on the light emergence surface of this bar-like integrator is uniform and therefore, if such a construction is adopted, uniform illuminating light can be applied to the surface to be irradiated.

The image projecting apparatus of the present invention is characterized by each of the illuminating systems, image forming means such as a liquid crystal display panel illuminated by the illuminating system, and a projection lens for projecting the image of the image forming means.

Any conventional basic construction of the image projecting apparatus can be applied, and for example, the illuminating system can constitute an image projecting apparatus characterized in that it has color resolving means for resolving the light from the light source device into three color lights of red, green and blue and the liquid crystal panel has a lens array comprising a plurality of positive minute lenses arranged so as to correspond to respective pixels (which are provided with three picture elements corresponding red, green and blue), the lens array being provided on the light incidence side of a liquid crystal layer, and the three colors, i.e., red, green and blue, illuminate the liquid crystal panel from different directions, or the illuminating system can constitute an image projecting apparatus characterized by color resolving means for resolving the light from the light source device into three color lights of red, green and blue, three liquid crystal panels corresponding to the three red, green and blue lights, and means for combining the red, green and blue image lights from the three liquid crystal panels and forming a colored image, and the color resolving means comprises a plurality of dichroic mirrors, diffraction gratings or the like.

Further, according to the present invention, there can also be provided an information processing apparatus characterized by the provision of such an image projecting apparatus and a computer.

Herein, the lens described as a positive lens refers to a lens having positive (+) refractive power (1/focal length), and the lens described a negative lens refers to a lens having negative (−) refractive power (1/focal length).

BRIEF DESCRIPTION OF THE DRAWINGS

FIG. 17 is an illustration of a portion of a cross-section perpendicular to the plane of the drawing sheet of FIG. 16.

FIGS. 18A, 18B, 18C and 18D are illustrations of Modification 1 of the integrator of FIG. 16.

FIGS. 19A, 19B, 19C and 19D are illustrations of Modification 2 of the integrator of FIG. 16.

FIGS. 20A, 20B, 20C and 20D are illustrations of Modification 3 of the integrator of FIG. 16.

FIGS. 21A, 21B, 21C and 21D are schematic views of the essential portions of a holding mechanism for the integrator of FIG. 16.

DESCRIPTION OF THE PREFERRED EMBODIMENTS

Figure 1:
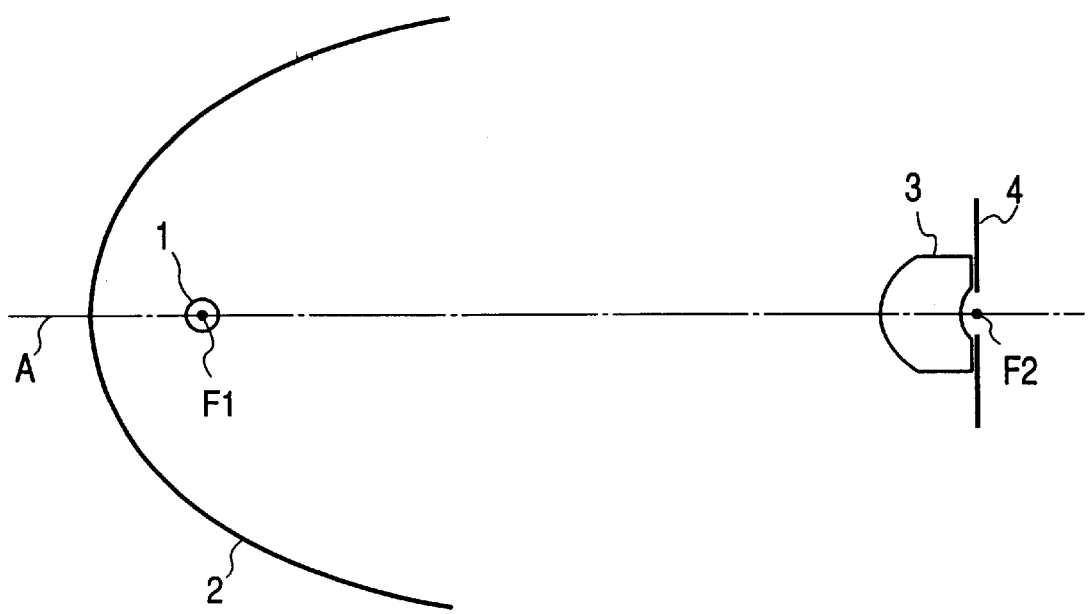
FIG. 1 is a cross-sectional view showing a first embodiment of the present invention.

FIG. 1 is a cross-sectional view of a first embodiment of the light source device of the present invention.

The first embodiment is comprised of an elliptical mirror 2, a light source 1 disposed at a first focal point F1 of the elliptical mirror 2, and a meniscus lens convex toward the light source 1 side and disposed between the elliptical mirror 2 and a second focal point F2 of the elliptical mirror 2 and in the optical path of light emitted from the light source 1 and converged by the elliptical mirror 2. The opening of a slit 4 shows the incidence opening (opening portion) of an optical system at a subsequent stage.

Figure 2:
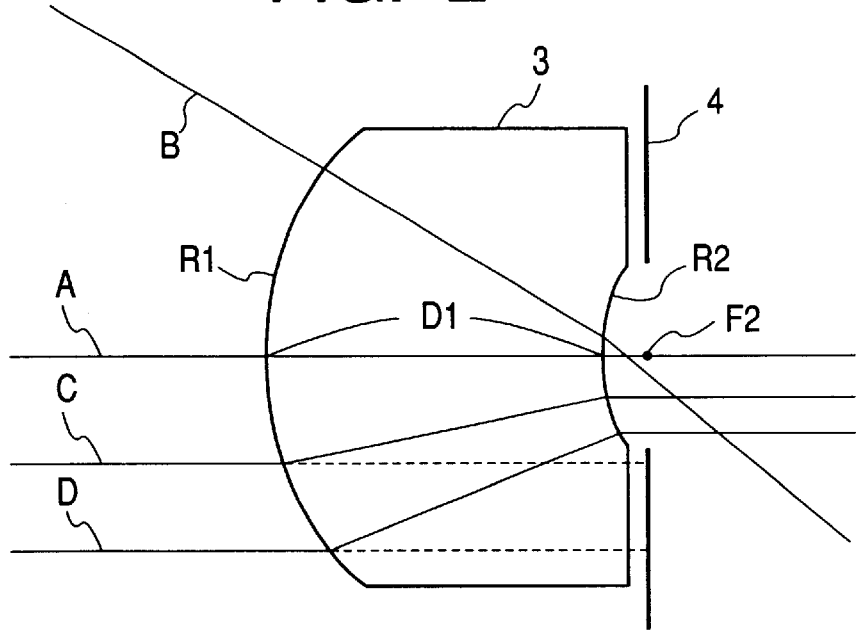
FIG. 2 is an illustration for illustrating the action of the meniscus lens of FIG. 1.

FIG. 2 is an illustration for illustrating the action and effect of the meniscus lens 3 of FIG. 1. In FIG. 2, the meniscus lens 3 has the radius of curvature R1 of its lens surface adjacent to the light source 1 side (hereinafter the lens surface adjacent to the light source 1 side is also represented by a character "R1") and its on-axis thickness D1 set substantially equally to each other and therefore, a ray of light B greatly inclined with respect to the optical axis A which has been reflected by the peripheral portion of the elliptical mirror 2 and travels toward the second focal point F2 of the elliptical mirror 2 is hardly refracted and deflected by the lens surface R1 but travels and enters into the opening of the slit 4. On the other hand, rays of light C and D substantially parallel to the optical axis A which have been reflected by the vicinity of the central portion of the elliptical mirror 2 are greater in the change in the height of the rays of light due to the refraction and deflection by the lens surface R1 as they become farther from the optical axis A, due to the optical characteristic of the meniscus lens 3, and the rays of light C and D which do not enter the opening of the slit 4 when the meniscus lens 3 is not disposed enter the opening of the slit 4.

Such a meniscus lens is thus disposed near the second focal point F2 of the elliptical mirror 2, whereby a ray of light substantially parallel to the optical axis A can be efficiently directed to the opening portion of the optical system at the subsequent stage. As the result, even if as described in Related Background Art, the position of the light emitting (portion) of the light source is moved in a direction intersecting with the optical axis A by arc jump, rays of light (substantially parallel to each other or little inclined) which make a light source image small in the amount of movement reflected by the vicinity of the center of the elliptical mirror 2 can be efficiently directed to the opening of the slit 4, and even if arc jump is created by the light source 1, the eclipse of the light entering the opening portion of the optical system at the subsequent stage can be reduced and accordingly, the change in the quantity of light supplied by the device can be made small.

Figure 3:
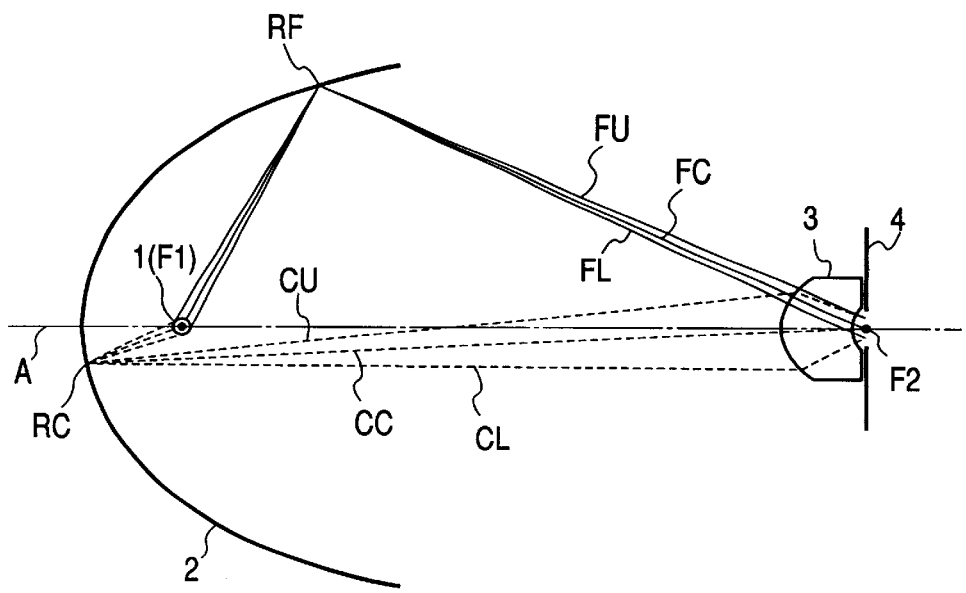
FIG. 3 is an illustration for illustrating another action of the meniscus lens of FIG. 1.

FIG. 3 also is an illustration for illustrating the action and effect of the meniscus lens of FIG. 1, and when the light emitting portion of the light source 1 has a predetermined size in a direction orthogonal to the optical axis A, the image of the light source 1 made at the second focal point F2 of the elliptical mirror 2 by a ray of light reflected by RC near the center of the elliptical mirror 2 greatly widens when the meniscus lens 3 is absent, but by disposing the meniscus lens 3, the image of the light source can be reduced. Accordingly, the image of the light source can be effectively contained in the small opening of the slit 4, and even if the light source 1 has a predetermined size, the eclipse of the light entering the opening portion of the optical system at the subsequent stage can be reduced and the illuminating efficiency can be improved.

The action and effect of the meniscus lens of the present invention described above with reference to FIGS. 2 and 3 also apply in a plurality of other embodiments which will be shown below.

Figure 4:
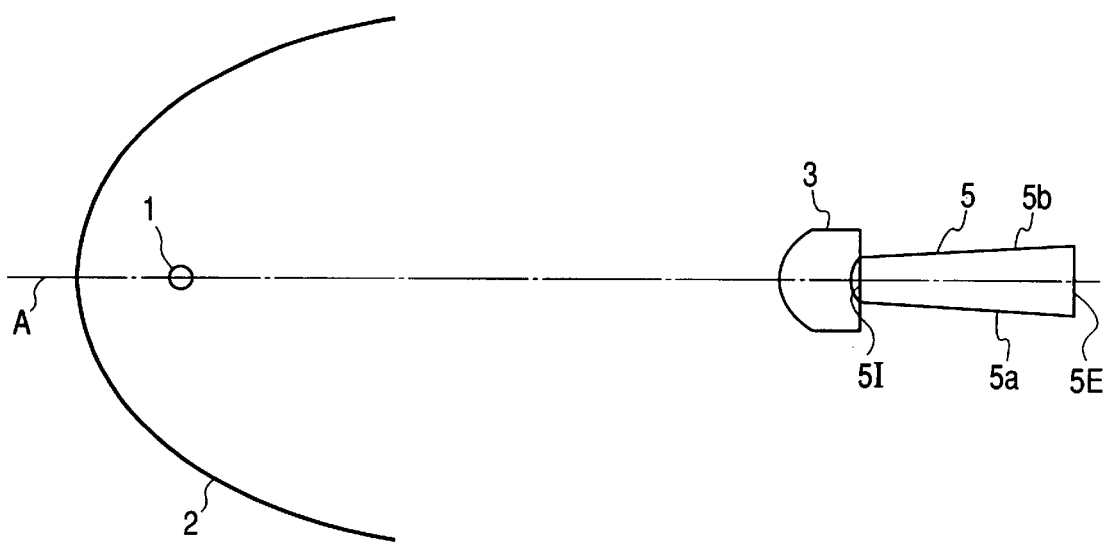
FIG. 4 is a cross-sectional view showing a second embodiment of the present invention.

FIG. 4 is a cross-sectional view of a second embodiment of the present invention. The second embodiment is an embodiment in which the slit 4 in the first embodiment is replaced by a bar-like integrator 5 (hereinafter referred to as the "glass rod integrator 5") formed of glass.

The glass rod integrator 5 is square or hexagonal in the shape of a cross-section orthogonal to the optical axis A, and when it is applied to a liquid crystal projector as will be described later, the cross-sectional shape thereof is set to a square in accordance with the configuration of the liquid crystal panel. Also, the glass rod integrator 5 is a pyramidal glass rod integrator of which the light emergence surface 5E is set larger than the light incidence surface 5I thereof.

The glass rod integrator 5 is disposed in close contact with the meniscus lens 3 and the image of the light source lying at or near the second focal point F2 of the elliptical error 2 is positioned at or near the light incidence surface 5I of the glass rod integrator 5, whereby the light emerging from the meniscus lens 3 can be caused to efficiently enter the light incidence surface 5I of the glass rod integrator 5, and a surface light source of uniform luminance distribution (light intensity distribution) can be obtained on the light emergence surface 5E of the glass rod integrator 5. All the surfaces of the glass rod integrator 5 are polished surfaces, and the light which has entered the interior of the glass rod integrator through the light incidence surface 5I repeats total reflection on the sides (wall surfaces) 5a and 5b of the glass rod integrator and is propagated, and arrives at the light emergence surface 5E in a state almost free of the loss of the quantity of light and is emitted therefrom.

Figure 5:
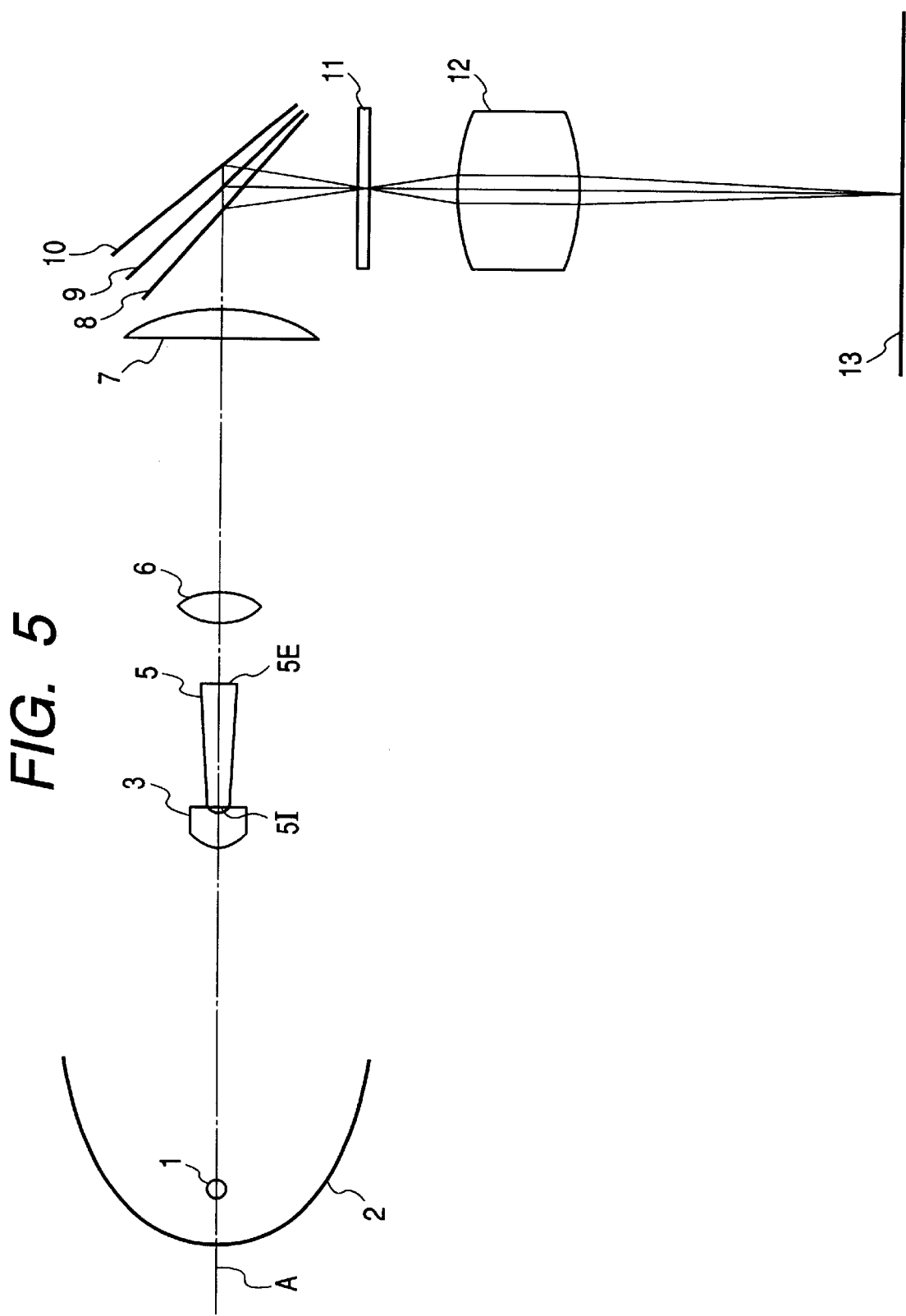
FIG. 5 is a cross-sectional view showing a third embodiment of the present invention.

FIG. 5 is a schematic view showing a third embodiment of the present invention, and shows an example in which the light source device of FIG. 4 is incorporated into a single-plate type color liquid crystal projector. The third embodiment has, in succession from the left side as viewed in FIG. 5, an elliptical mirror 2, a light source 1 disposed at a first focal point of the elliptical mirror 2, a meniscus lens 3 convex toward the light source side, a glass rod integrator 5, a first positive lens unit 6, a second positive lens unit 7, and three dichroic mirrors 8, 9 and 10, and further comprises a liquid crystal panel 11 provided with a microlens array on the dichroic mirrors 8, 9, 10 side (the light incidence side of the liquid crystal layer), a projection lens 12 and a screen 13.

White light emitted from the light source 1 is converged by the elliptical mirror 2, is condensed at a second focal point of the elliptical mirror 2, and enters the light incidence surface 5I of the glass rod integrator 5 through the meniscus lens 3. The white light repeatedly totally reflected in the interior of the glass rod integrator 5 becomes a light having a uniform light intensity distribution on the light emergence surface 5E of the glass rod integrator 5. The light emergence surface 5E of the glass rod integrator 5 is enlarged and imaged on the liquid crystal panel 11 by the first positive lens unit 6 and the second positive lens unit 7. The three dichroic mirrors 8, 9 and 10 disposed at different angles with respect to the optical path resolve the white light from the light source device into illuminating lights of three colors, i.e., red (R), green (G) and blue (B), and cause the R, G and B light beams to enter the liquid crystal panel 11 at different angles. The R, G and B illuminating lights are condensed on the pixels of the liquid crystal panel 11 by the microlens array thereof, and the liquid crystal of each pixel (a picture element corresponding to each color) is selectively driven by a liquid crystal driving circuit, not shown, whereby the light which has entered each pixel can be modulated, and the modulated light is projected as a colored image onto the screen 13 by the projection lens 12. The liquid crystal panel 11 and the liquid crystal driving circuit can assume various conventional constructions. A liquid crystal projector comprising a combination of three dichroic mirrors 8, 9, 10 and a liquid crystal panel with a microlens array is described, for example, in Japanese Patent Application Laid-Open No. 4-60538 and therefore, for the detailed construction thereof, this publication can be referred to. Also, a diffraction grating or the like can be used in lieu of the three dichroic mirrors.

Figure 6:
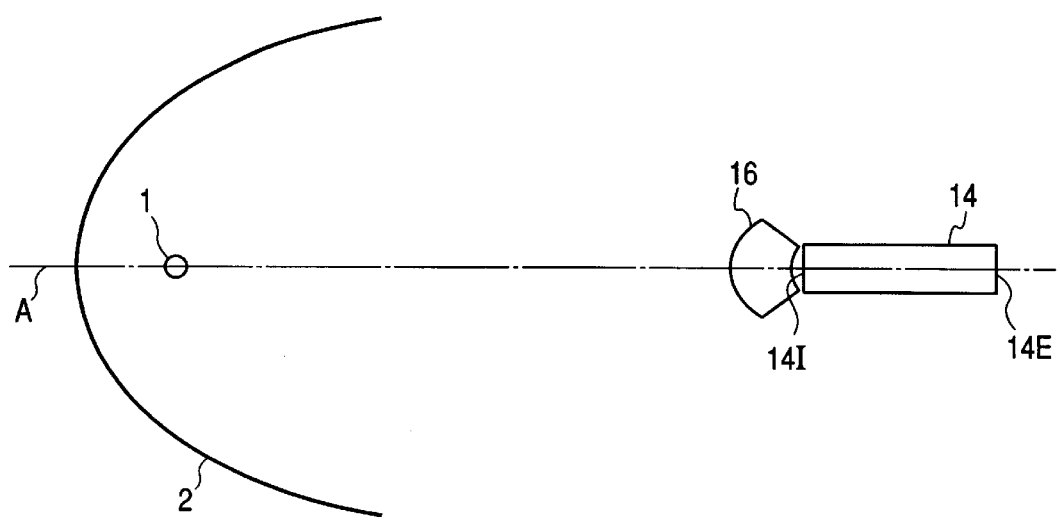
FIG. 6 is a cross-sectional view showing a fourth embodiment of the present invention.

FIG. 6 is a cross-sectional view of a fourth embodiment of the present invention. The fourth embodiment is designed such that a side of a meniscus lens 16 is conical and light impinging on the side is also caused to enter the incidence surface of a glass rod integrator 14 by total reflection, and accordingly the fluctuation of the quantity of light on the light emergence surface 14E of the glass rod integrator 14 by the arc jump of the light source 1 becomes smaller. In the fourth embodiment, use is made of a prismatic glass rod integrator 14 of which the diameter is constant from the light incidence surface 14I to the light emergence surface 14E.

Figure 7:
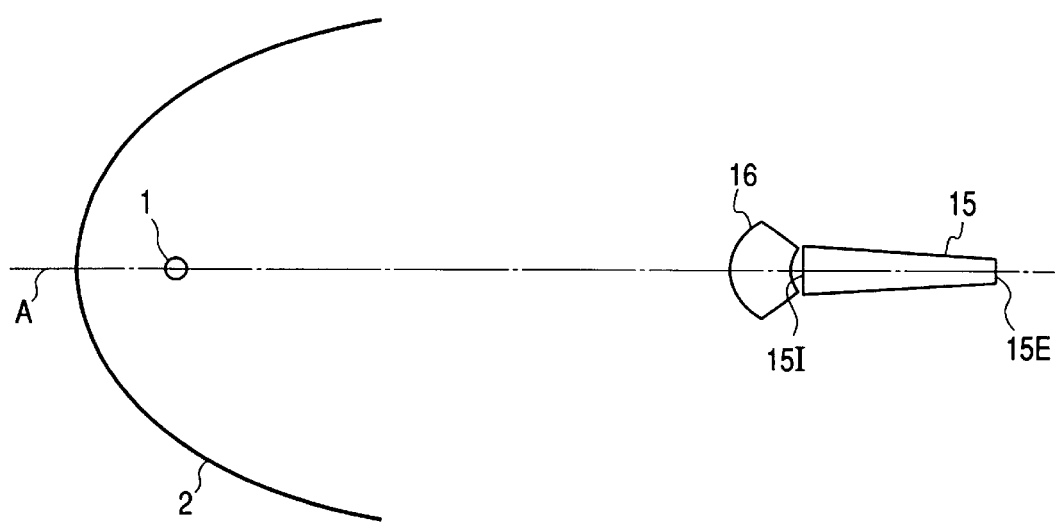
FIG. 7 is a cross-sectional view showing a fifth embodiment of the present invention.

FIG. 7 is a cross-sectional view of a fifth embodiment of the present invention. The difference of the fifth embodiment from the fourth embodiment is that as shown in FIG. 7, the diameter of the light emergence surface 15E of a glass rod integrator 15 is made smaller than that of the light incidence surface 15I thereof, and the construction of the fifth embodiment is effective when a very small surface light source of which the luminance distribution is uniform is required.

Figure 8:
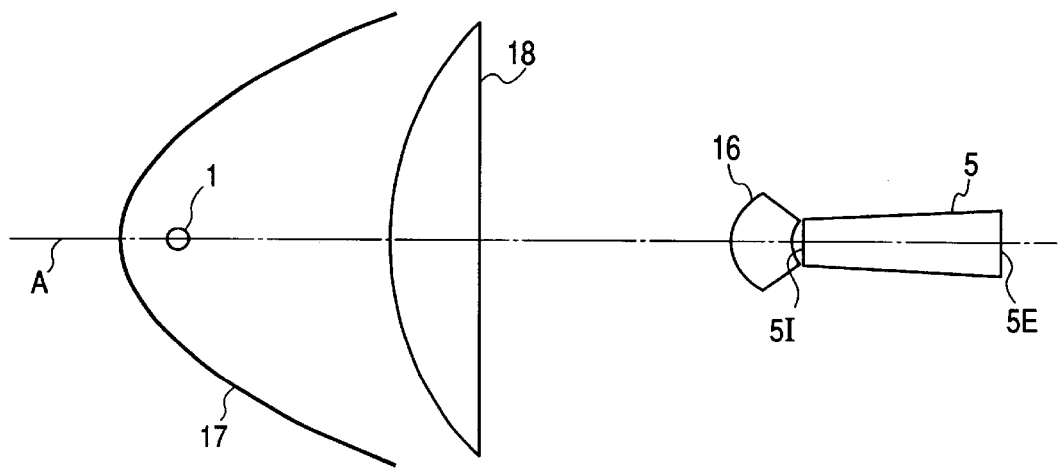
FIG. 8 is a cross-sectional view showing a sixth embodiment of the present invention.

FIG. 8 is a cross-sectional view of a sixth embodiment of the present invention. The differences of the sixth embodiment from the fourth embodiment are that an imaging system comprising a parabolic surface mirror 17 and a positive lens 18 is used as a condenser for the white light from the light source 1 and that as in the case of the second embodiment, use is made of a glass rod integrator 5 of which the diameter of the light emergence surface 5E is larger than that of the light incidence surface 5I.

The parabolic surface mirror 17 has the advantage that it is easy to mount because its mounting accuracy is rough. Also, the difference in magnification between the vicinity of the center and the peripheral portion of the parabolic surface mirror 17 is greater than in the case of an elliptical mirror and therefore, the condensing effect of the meniscus lens 16 becomes remarkable.

Figure 9:
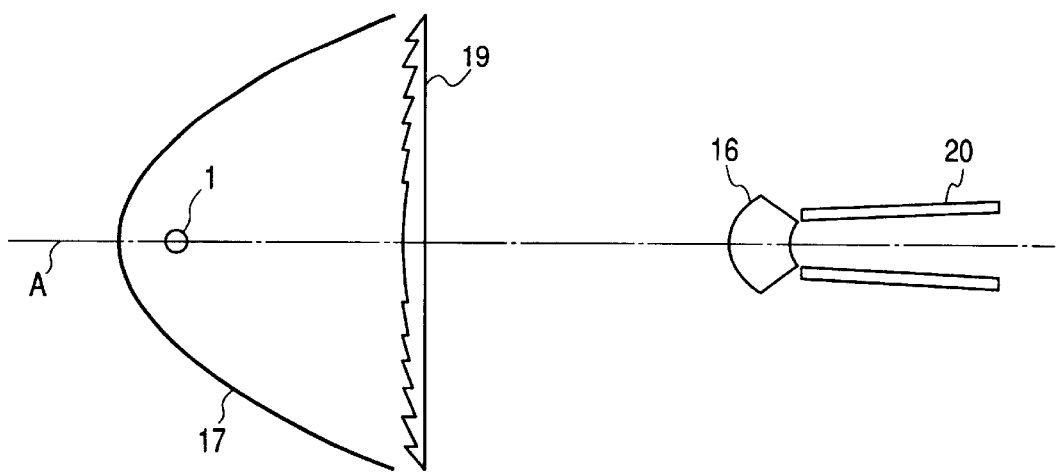
FIG. 9 is a cross-sectional view showing a seventh embodiment of the present invention.
Figure 10:
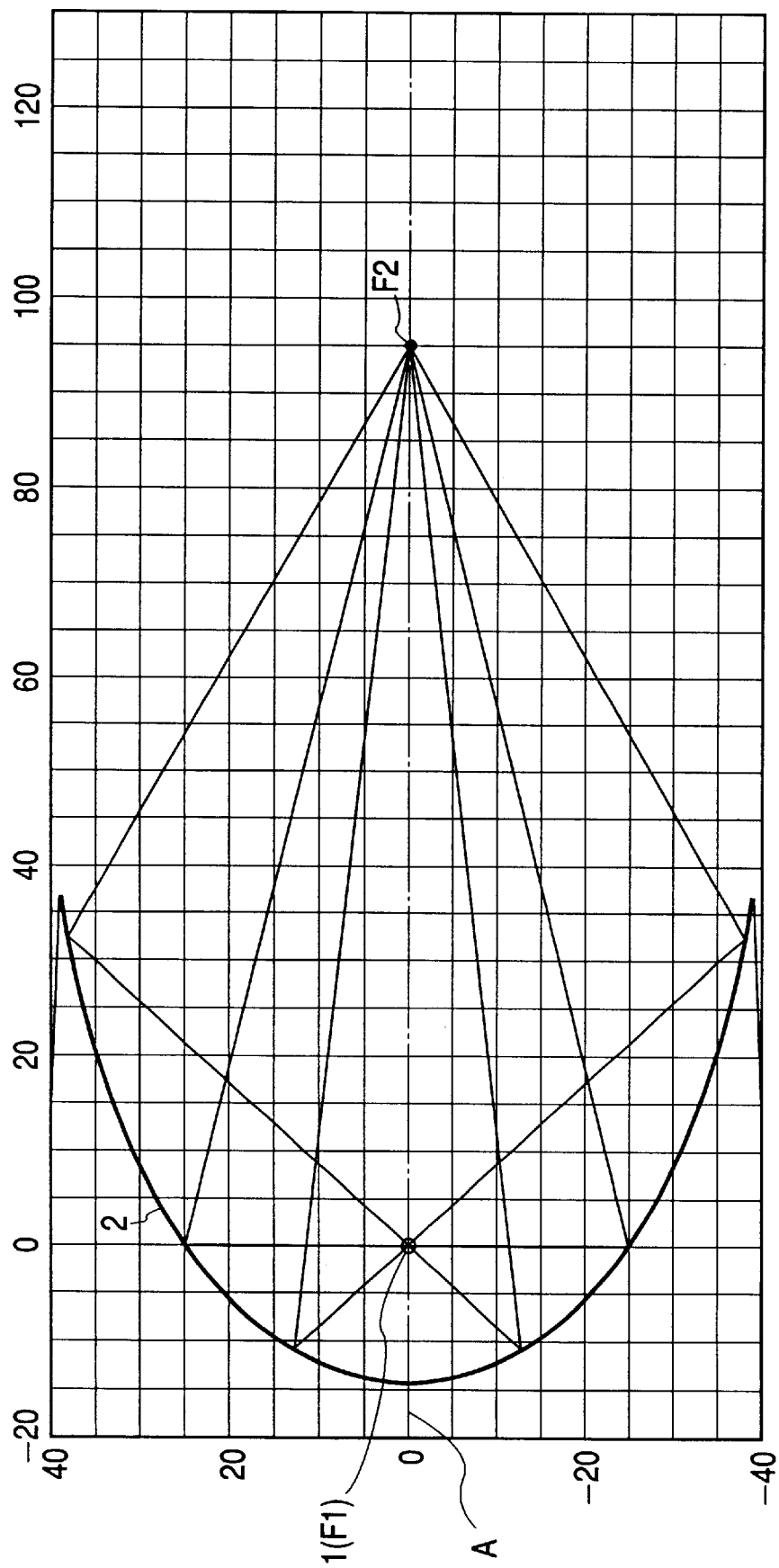
FIG. 10 is an illustration for illustrating the imaging characteristic of an elliptical mirror.
Figure 11:
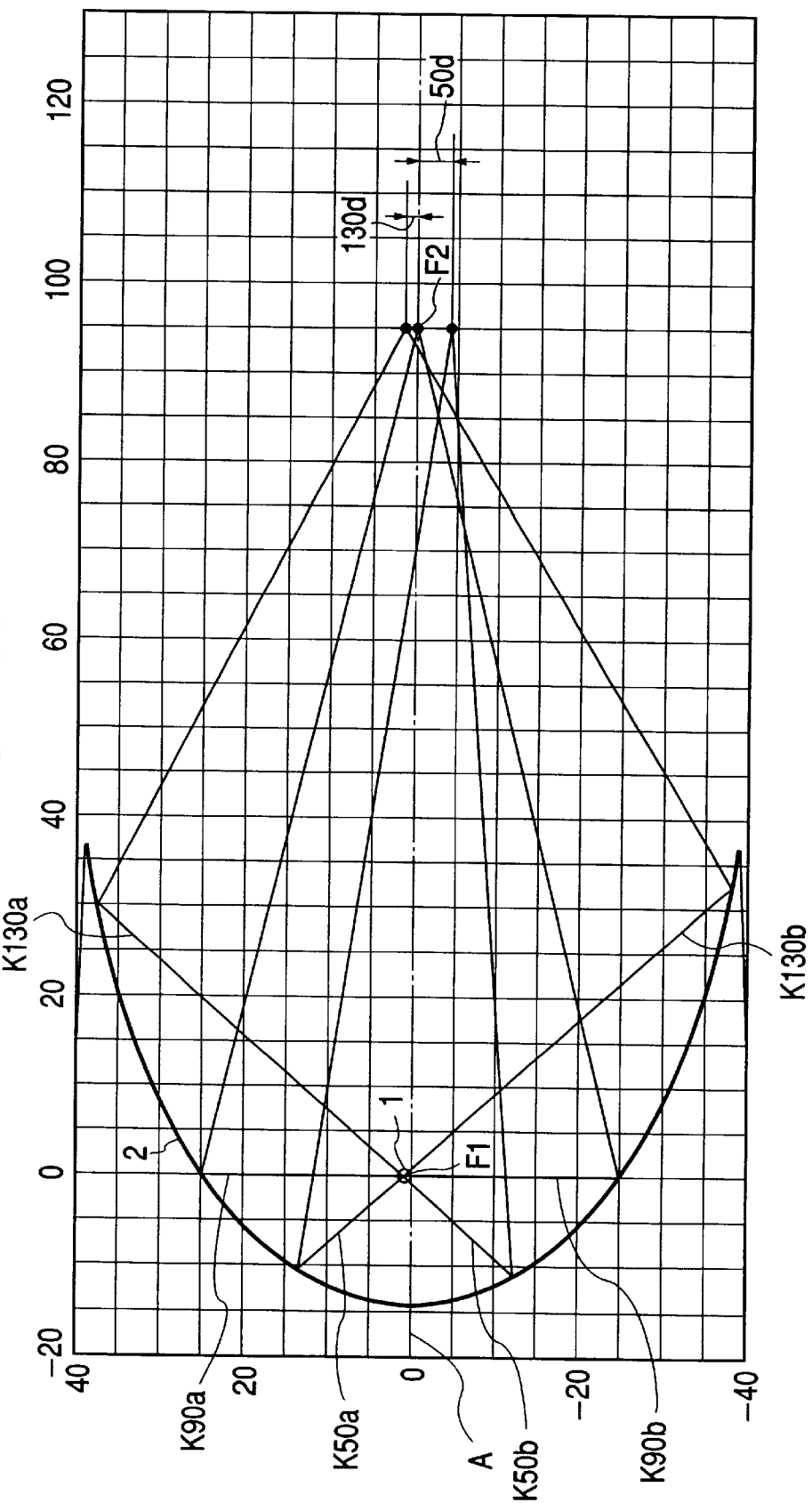
FIG. 11 is an illustration for illustrating the imaging characteristic of the elliptical mirror.

FIG. 9 is a cross-sectional view of a seventh embodiment of the present invention. The differences of the seventh embodiment from the sixth embodiment are that the plano-convex lens 18 of FIG. 8 which is a positive lens is replaced by a relatively thin positive Fresnel lens and that the glass rod integrator 5 is replaced by a kaleidoscope 20 comprising a plurality of reflecting mirrors of which the surfaces opposed to each other are reflecting surfaces and which are combined into a cylindrical shape. The kaleidoscope 20 comprises a plurality of reflecting mirrors combined into a cylindrical shape so that their reflecting surfaces may be opposed to each other, and as in the glass rod integrator, light provided with a uniform light intensity distribution is supplied to the light emergence portion of the kaleidoscope 20.

In each of the embodiments shown in FIGS. 4 to 8, the kaleidoscope as shown in FIG. 9 can be used in lieu of the glass rod integrator.

Each of the light source devices of the embodiments shown in FIGS. 6 to 9 can be used as the light source device of the liquid crystal projector of FIG. 5. Also, the light source device of each of the embodiments shown in FIGS. 4 and 6 to 9 can be applied to the light source device of a color liquid crystal projector of the three-plate type comprising liquid crystal panels disposed in the optical paths of R, G and B color lights from a color resolving system such as a group of dichroic mirrors or the like, instead of the single-plate type color liquid crystal projector of FIG. 5.

Any of various lamps such as high pressure mercury lamps in which there arises the problem described in connection with the Related Background Art is applicable as the light source in each of the above-described embodiments.

In each of the above-described embodiments, at least one of the light source side lens surface of the meniscus lens convex toward the light source side and the lens surface opposite to the light source may be construded of an aspherical surface, whereby the optical path of each incident ray of light may be controlled more accurately.

While in each of the above-described embodiments, the light from the light source (light emitting portion) is converged by a combination of the elliptical mirror, the parabolic surface mirror and the positive lens to thereby form the image of the light source, use may be made of a combination of a spherical mirror and a positive lens. In this case, the light source is disposed at the center (position) of the curvature of the spherical mirror, and one conjugate point of the positive lens is set at this center position of the curvature and the image of the light source is formed at the other conjugate point of the positive lens, and the meniscus lens convex toward the light source side is placed near the image of the light source in the optical path of the convergent light by the positive lens.

The above-described color liquid crystal projector can be combined with a conventional computer to thereby constitute an information processing apparatus.

The meniscus lens convex toward the light source side in each of the above-described embodiments satisfies the following conditional expressions (1) and (2), where R1 represents the radius of curvature of the light source side lens surface of the meniscus lens, R2 represents the radius of curvature of the lens surface of the meniscus lens which is opposite to the light source, and DI represents the on-axis thickness of the meniscus lens.

$$0.5 < D1/R1 < 2 \tag{1}$$

$$0.2 < R2/R1 < 2 \tag{2}$$

The meniscus lens convex toward the light source side in the present invention is preferably designed to satisfy the following conditional expressions (3) and (4):

$$0.65 < D1/R1 < 1.6 \tag{3}$$

$$0.3 < R2/R1 < 1.4 \tag{4}$$

Conditional expressions (1) and (3) prescribe the ratio between the on-axis thickness and the radius of curvature R1 of the light source side lens surface, and outside the ranges of these conditional expressions, the range of the illuminating light widens on the lens surface of the meniscus lens which is opposite to the light source and the illuminating efficiency is reduced.

Conditional expressions (2) and (4) prescribe the ratio between the radius of curvature R1 of the light source side lens surface and the radius of curvature R2 of the lens surface opposite to the light source, if the lower limit values of these conditional expressions are exceeded, the radius of curvature R2 will become too small and therefore, total reflection will occur on the peripheral portion of the lens surface opposite to the light source and the illuminating efficiency will be reduced, and if the upper limit values of these conditional expressions are exceeded, the radius of curvature R2 will become too large and therefore, the angle of emergency of parallel rays of light incident on the peripheral portion of the light source side lens surface on the lens surface opposite to the light source will become great and thus, the illuminating efficiency will be reduced.

Figure 12:
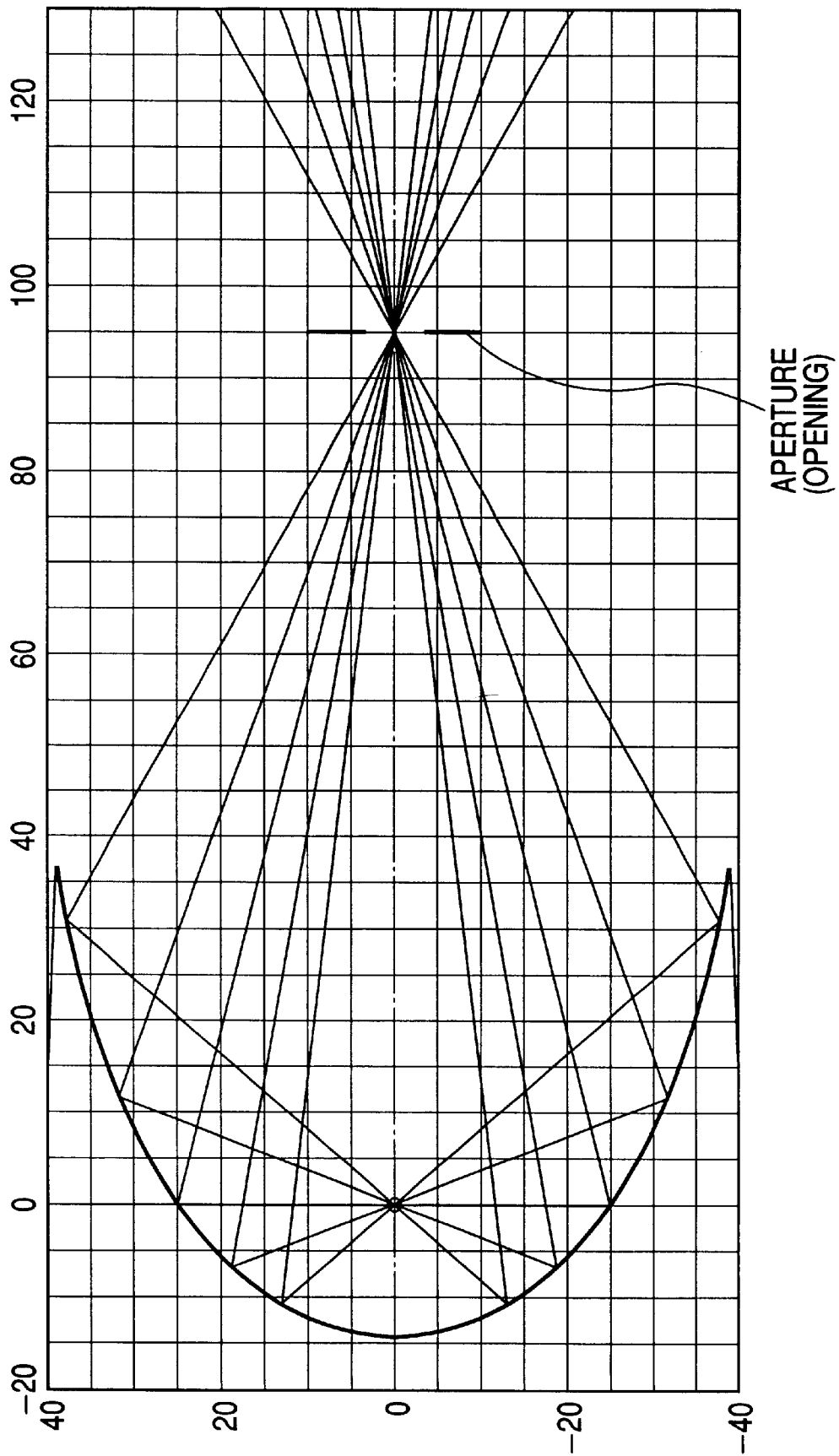
FIG. 12 shows the optical path in the case of only the elliptical mirror when a light source (light emitting portion) is coincident with a first focal point of the elliptical mirror.
Figure 13:
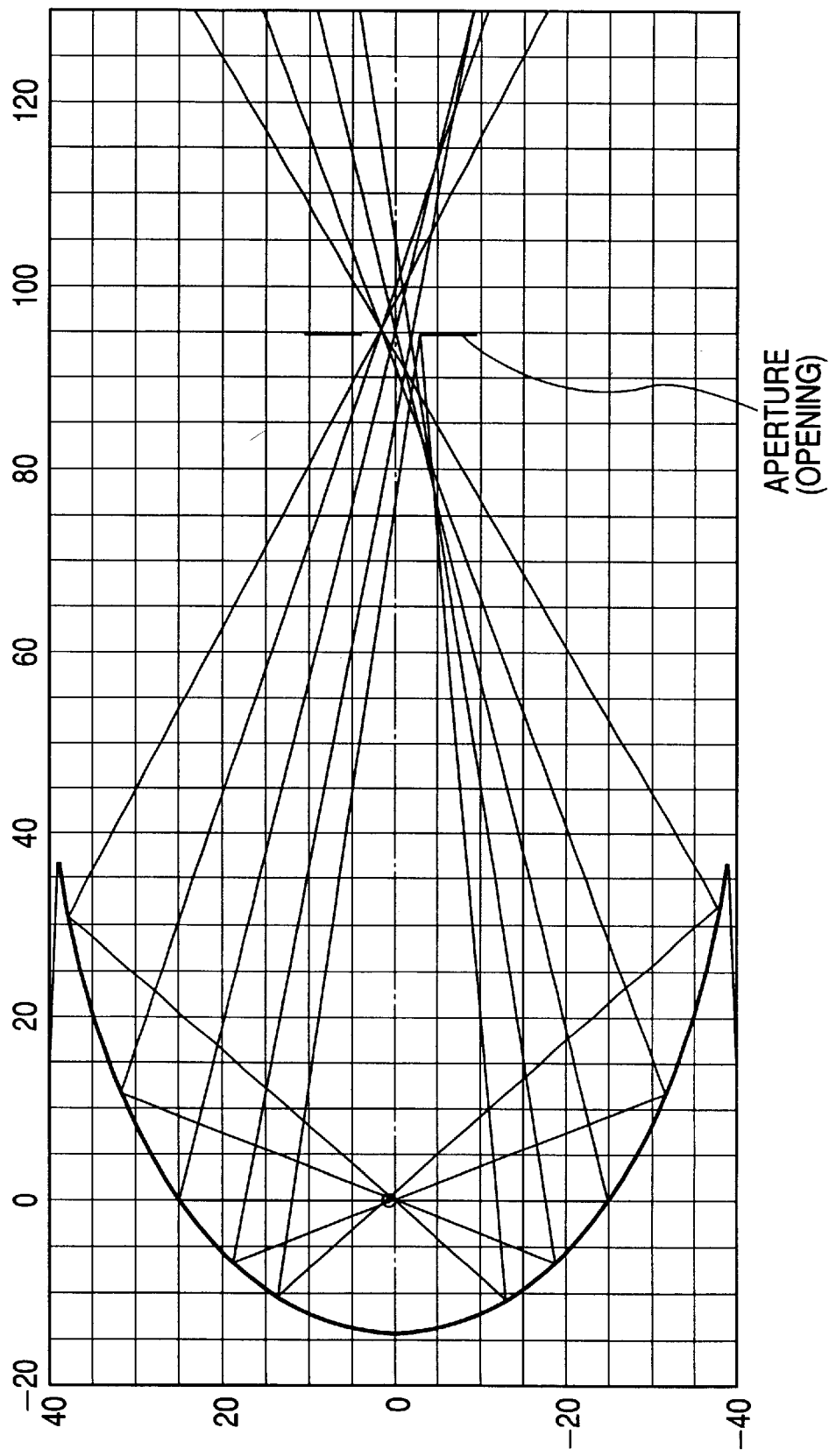
FIG. 13 shows the optical path in the case of only the elliptical mirror when the light source (light emitting portion) has been moved from the first focal point of the elliptical mirror onto 0.5 mm on the plane of the drawing sheet.

FIGS. 12 and 13 are optical path views showing the state of the convergence of rays of light before and after arc jump of 0.5 mm occurs to the light source when the convex meniscus lens is not used but the light from the light source (high pressure mercury lamp) is converged by only the elliptical mirror to thereby form the image of the light source, FIG. 12 being an optical path view before the arc jump occurs, and FIG. 13 being an optical path view when the arc jump of 0.5 mm has occurred. It will be seen from FIGS. 12 and 13 that when the arc jump occurs, the rays of light reflected by the vicinity of the central portion of the elliptical mirror do not enter the opening portion of the slit.

Figure 14:
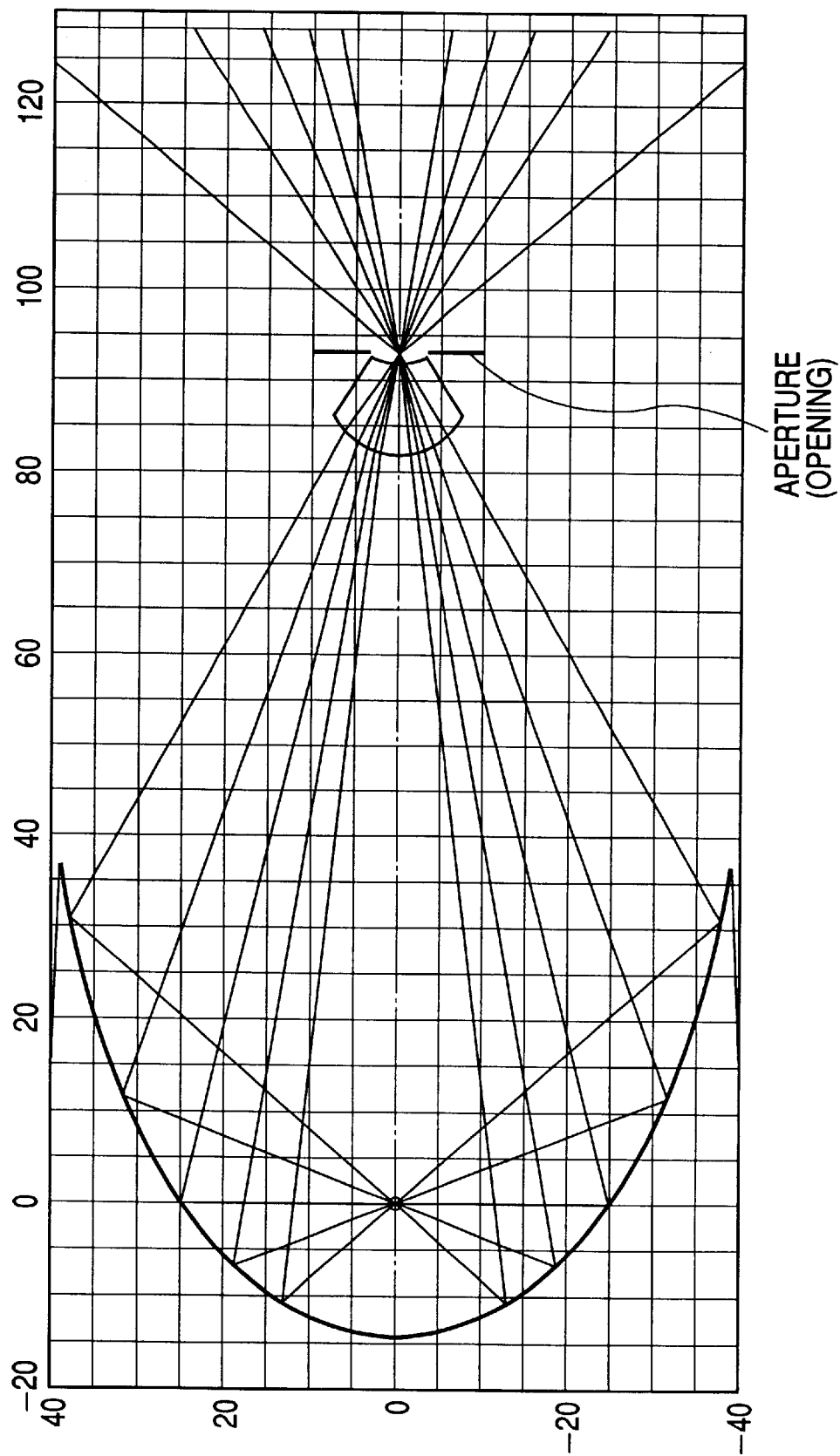
FIG. 14 shows the optical path in the case of Numerical Value Embodiment 1 of the present invention when the light source (light emitting portion) is coincident with the first focal point of the elliptical mirror.
Figure 15:
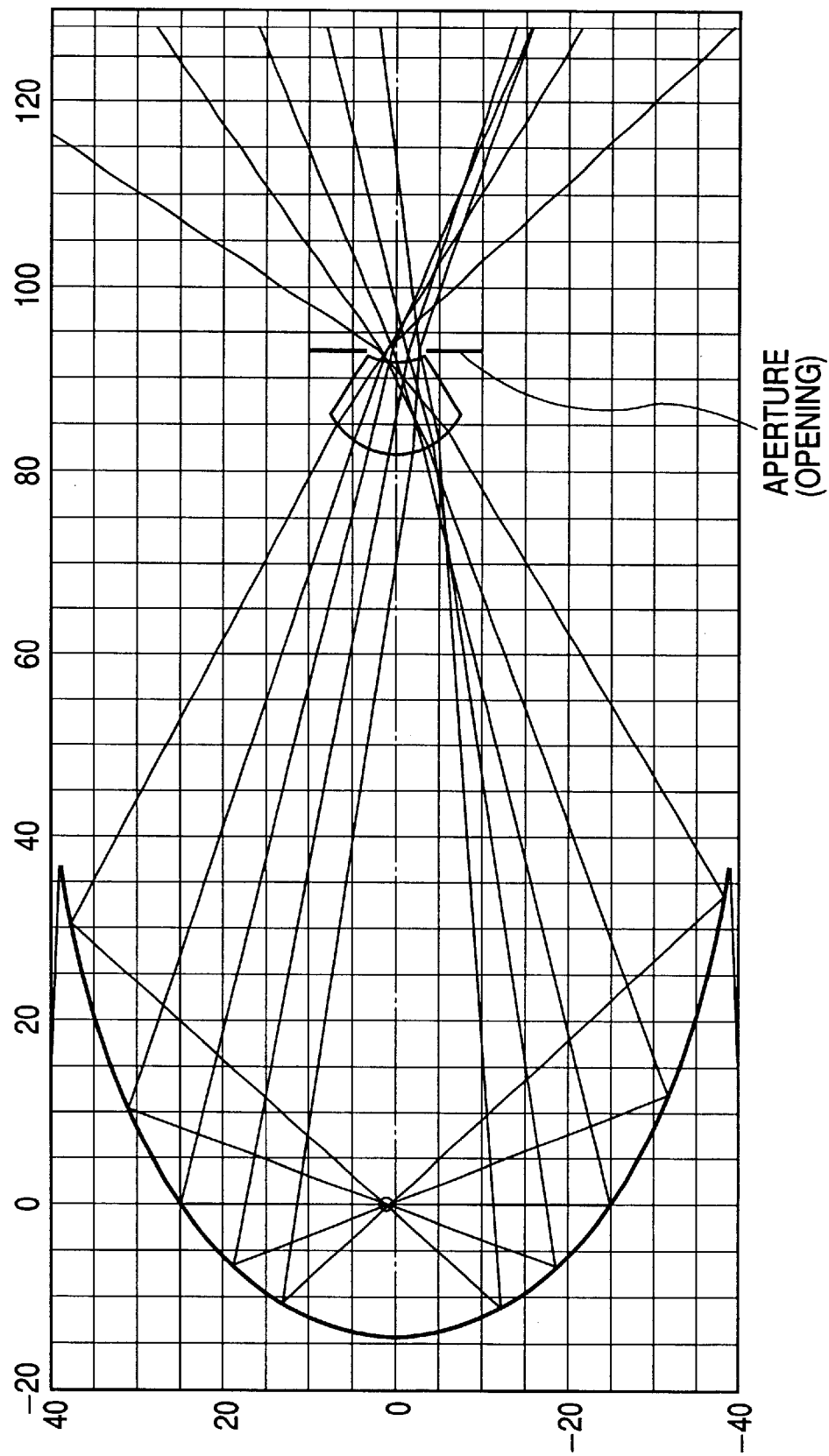
FIG. 15 shows the optical path in the case of Numerical Value Embodiment 1 of the present invention when the light source (light emitting portion) has been moved from the first focal point of the elliptical mirror onto 0.5 mm on the plane of the drawing sheet.

On the other hand, FIGS. 14 and 15 are optical path views showing the state of rays of light before and after arc jump of 0.5 mm occurs when the meniscus lens of the present invention which is convex toward the light source side is also used, FIG. 14 being an optical path view before the arc jump occurs, and FIG. 15 being an optical path view when the arc jump of 0.5 mm has occurred. It will be seen from FIGS. 14 and 15 that according to the present invention, even if arc jump occurs to (the light emitting portion of) the light source, almost all or all of the rays of light reflected by the elliptical mirror can be caused to enter the aforementioned slit or the opening of the aforementioned integrator. The light source device shown in FIGS. 14 and 15 is the device of Numerical Value Embodiment 1 of the light source device of the present invention which will be shown below.

Numerical Value Embodiments 1 to 4 of the light source device of the present invention will hereinafter be shown. As regards the present numerical value embodiment, the construction of the optical system is that shown in FIG. 1. Any of the numerical value embodiments can reduce the eclipse of the rays of light in the slit 4 more greatly than in a conventional case where the meniscus lens convex toward the light source side is not provided.

<Numerical Value Embodiment 1>

Elliptical mirror the first focal point F1: 14 mm (the on-axis interval from the center of the elliptical mirror) the second focal point F2: 109 mm (ditto)

The on-axis interval between the first focal point and the light source side lens surface of the meniscus lens: 82.15 mm The radius of curvature R1 of the light source side lens surface of the meniscus lens: 8.201 mm The radius of curvature R2 of the lens surface of the meniscus lens which is opposite to the light source: 4.554 mm The on-axis thickness D of the meniscus lens: 10 mm The refractive index N of the meniscus lens in d-line: 1.4714

D/R1=1.219

R2/R1=0.553

<Numerical Value Embodiment 2>

Elliptical mirror the first focal point F1: 17 mm (the on-axis interval from the center of the elliptical mirror) the second focal point F2: 102 mm (ditto)

The on-axis interval between the first focal point and the light source side lens surface of the meniscus lens: 85 mm The radius of curvature R1 of the light source side lens surface of the meniscus lens: 9 mm The radius of curvature R2 of the lens surface of the meniscus lens which is opposite to the light source: 5 mm The on-axis thickness D of the meniscus lens: 10 mm The refractive index N of the meniscus lens in d-line: 1.5

D/R1=1.111

R2/R1=0.555

<Numerical Value Embodiment 3>

Elliptical mirror the first focal point F1: 14 mm (the on-axis interval from the center of the elliptical mirror) the second focal point F2: 109 mm (ditto)

The on-axis interval between the first focal point and the light source side lens surface of the meniscus lens: 84.15 mm The radius of curvature R1 of the light source side lens surface of the meniscus lens: 8 mm The radius of curvature R2 of the lens surface of the meniscus lens which is opposite to the light source: 5 mm The on-axis thickness of the meniscus lens: 10 mm The refractive index N of the meniscus lens in d-line: 1.5

D/R1=1.25

R2/R1=0.625

<Numerical Value Embodiment 4>

Elliptical mirror the first focal point F1: 14 mm (the on-axis interval from the center of the elliptical mirror) the second focal point F2: 109 mm (ditto)

The on-axis interval between the first focal point and the light source side lens surface of the meniscus lens: 84.15 mm The radius of curvature R1 of the light source side lens surface of the meniscus lens: 12 mm The radius of curvature R2 of the lens surface of the meniscus lens which is opposite to the light source: 5 mm The on-axis thickness of the meniscus lens: 10 mm The refractive index N of the meniscus lens in d-line: 1.6

D/R1=0.833

R2/R1=0.417

According to each of the above-described embodiments, there can be realized a light source device, an illuminating system, an image projecting apparatus and an information processing apparatus in which even if for example, the fluctuation or the like of the light emitting portion of a light source occurs, the reduction in the quantity of illuminating light is small and accordingly, the change in the quantity of illuminating light can also be made small. When for example, a light source unit comprising an elliptical mirror and a light source made integral with each other is manufactured and this light source unit is to be mounted on one of various apparatuses, even if a mounting error occurs, the reduction in illuminating light becomes small and therefore, the interchange of the lamp unit of a liquid crystal projector using a light source unit of this kind can be realized by a user.

Figure 16:
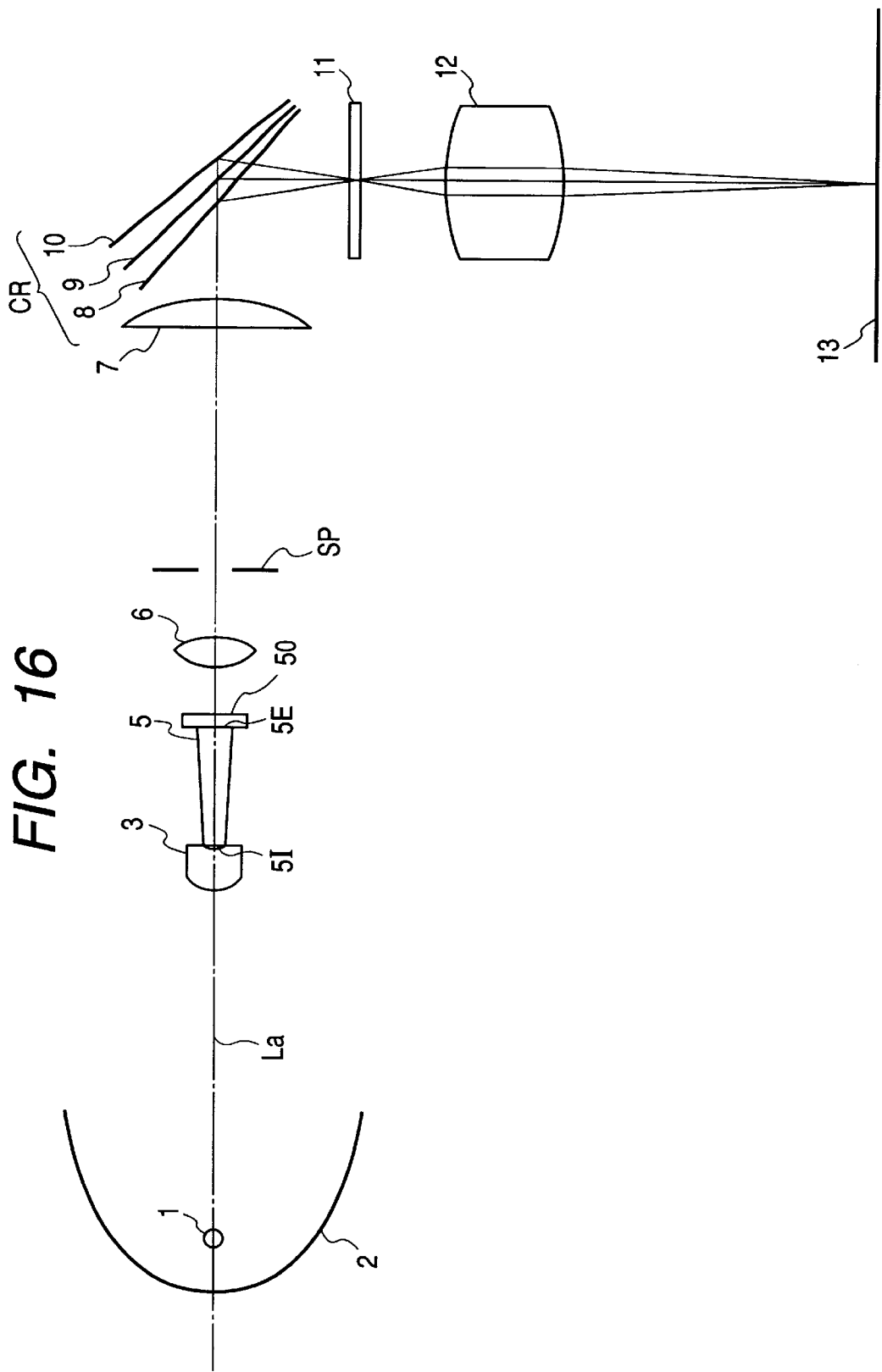
FIG. 16 is a schematic view of the essential portions of an eighth embodiment of the present invention.

FIG. 16 is a schematic view of the essential portions of an eighth embodiment of the illuminating system and image projecting apparatus of the present invention. FIG. 17 is a schematic view of a portion in a cross-section perpendicular to the plane of the drawing sheet of FIG. 16.

In this embodiment, a single-plate color liquid crystal display element is illuminated by the illuminating system, and a color image (image information) displayed by it is enlarged and projected onto a screen by a projection lens, and there is shown a case where the present invention is applied to a color liquid crystal projector.

In FIG. 16, the reference numeral 1 designates a white light source such as a metal halide lamp, and the reference numeral 2 denotes an elliptical mirror which is a reflector provided with a rotatable elliptical reflecting mirror for efficiently reflecting a light beam from the light source 1. The reference numeral 5 designates a bar-like integrator for uniformizing the cross-sectional light intensity distribution of the light beam from the light source I and causing the light beam to emerge, and this integrator 5 comprises a bar-like transparent light-transmitting member having a polygonal or circular cross-sectional shape and having an inner surface which is a reflecting surface. In the integrator 5, the maximum cross-sectional area of the light incidence surface 5I thereof in a direction perpendicular to the optical axis of the illuminating system is large as compared with the maximum cross-sectional area of the light emergence surface 5E thereof in a direction perpendicular to the optical axis of the illuminating system.

The reference numerals 3 and 50 denote transparent support members having an outer dimension larger than the outer dimension of end surfaces provided on the light incidence surface 5I and light emergence surface 5E of the integrator 5 in a direction orthogonal to the optical axis of the illuminating system.

The transparent support member 3 comprises the aforedescribed positive meniscus lens having its convex surface facing the light source 1 side (light incidence direction). The transparent support member 50 comprises a plane parallel plate. The reference numeral 6 designates a first lens unit having positive refractive power, the reference character SP denotes a stop, and the reference numeral 7 designates a second lens unit having positive refractive power, and the light beam from the integrator 5 is condensed and directed to a color resolving system CR by these elements 6, SP and 7.

The color resolving system CR comprises a dichroic mirror 8 reflecting red, a dichroic mirror 9 reflecting green, and a dichroic mirror 10 reflecting blue, and the three dichroic mirrors are slightly inclined with respect to one another, and separate a light beam entering the color resolving system CR into three red, green and blue light beams slightly differing in the direction of travel from one another. The reference numeral 11 denotes a liquid crystal display element, and a microlens (lens array) is attached to the light source 1 side of each pixel thereof. The reference numeral 12 designates a projection lens for enlarging and projecting an image displayed on the liquid crystal display element 11, and the reference numeral 13 denotes a screen onto which the image is enlarged and projected.

In the present embodiment, the light emitted from the light source 1 is reflected by the reflector 2 and enters the light incidence surface 5I which is one end surface of the integrator 5 through the transparent support member 3. A light beam of uniform light intensity distribution appearing on the light emergence surface 5E of the integrator 5 is caused to enter the color resolving system CR through the transparent support member 50, the lens 6, the stop SP and the lens 7, and this white light beam is resolved into R, G and B light beams slightly differing in the direction of travel from one another by the color resolving system CR, and these light beams illuminate the liquid crystal display element 11. At this time, the lights are condensed on pixels exclusively for respective colors R, G and B disposed at different positions correspondingly to the microlenses on the liquid crystal display element 11, and the monochromatic R, G and B pixels are illuminated by the respective color lights.

Colored image information displayed by the R, G and B pixels is enlarged and projected onto the surface of the screen 13 by the projection lens 12. At this time, (the light of uniform intensity distribution appearing on) the light emergence surface 5E of the integrator 5 is imaged on the liquid crystal display element 11.

In the present embodiment, the light incidence surface 5I of the integrator 5 is held by the meniscus lens 3 having its convex surface facing the light source 1 side and the light emergence surface 5E of the integrator 5 is held by the transparent plane parallel plate 50, whereby the integrator 5 is held in the optical system without causing any loss of the quantity of light.

The meniscus lens 3 having its convex surface facing the light source 1 side is disposed on the light incidence surface 5I of the integrator 5, whereby even if as previously described, arc jump occurs to the light source 1, the light reflected by the vicinity of the optical axis La of the elliptical mirror 2 and heretofore diffused to the outside of the light incidence surface 5I of the integrator 5 is caused to enter the light incidence surface 5I of the integrator 5.

The integrator 5 of FIG. 16, in its cross-section along the longer side of the liquid crystal display element 11 (the cross-section of FIG. 16), has a wedge angle formed in a direction in which the vertex of the wedge is positioned on the light source 1 side, and in its cross-section along the shorter side of the element 11 (the cross-section of FIG. 17), has a wedge angle formed so that the vertex of the wedge may be positioned on the projection lens 12 side. The wedge angle of the integrator 5 in the cross-sectional direction along the longer side is made to face in this direction and the angle of the ray of light having entered the integrator 5 is made small when the ray of light emerges from the light emergence surface 5E, whereby the parallelism of the rays of light entering the liquid crystal display element 11 is made good.

Thus, in the cross-section of FIG. 16 effecting color resolution, the parallelism of the light beam entering the liquid crystal display element 11 is made good to thereby prevent the mixing of the colors on the element 11. The light source 1 side principal point of the first lens unit 6 is spaced apart by the focal length f6 of the first lens unit 6 from the light emergence surface 5E of the integrator 5, and the spacing between the principal points of the first lens unit 6 and the second lens unit 7 is equal to the sum of the focal length f6 of the first lens unit 6 and the focal length f7 of the second lens unit 7. The spacing between the element 11 side principal point of the second lens unit 7 and the element 11 is equal to the focal length f7 of the second lens unit 7.

Here, the focal lengths f6 and f7 are in the relation that f6<f7. By the first lens unit 6 and the second lens unit 7 being thus disposed, the enlarged image of the light emergence surface 5E of the integrator 5 is projected onto the liquid crystal display element 11. At this time, the projection magnification is the ratio f7/f6 between the focal length f6 of the first lens unit 6 and the focal length f7 of the second lens unit 7. By the second lens unit 7 being used, the illuminating light entering the element 11 is made parallel up to the peripheral portion of the screen.

The surface of the transparent plane parallel plate 50 is made to bear against the light emergence surface 5E of the integrator 5 to thereby prevent dust from adhering to the light emergence surface 5E of the integrator 5 and the image of the dust from being enlarged and projected onto the liquid crystal display element 11, and also the light emergence surface 5E of the integrator 5 is held by the transparent plane parallel plate 50 to thereby prevent any loss of the quantity of light.

Also, the stop SP is provided between the first lens unit 6 and the second lens unit 7 to thereby cut any unnecessary light which will cause the mixing of color on the liquid crystal display element 11. This is accomplished by causing the image of the opening of the stop SP to be formed on each pixel of the element 11 by each microlens of the element 11, and also enlarging the shape of the opening of the stop SP relative to the shape of the pixels of the element 11, by the ratio between the focal length f7 of the second lens unit 7 and the focal length of the microlens of the element 11.

Description will now be made of the shapes of the integrator 5 applicable to the present embodiment. FIGS. 18A, 18B, 18C, 18D to FIGS. 20A, 20B, 20C, 20D are illustrations of Modifications 1 to 3 of the integrator of FIG. 16. In Modification 1 of FIGS. 18A to 18D, the light incidence surface 5I is a square of 4.6×4.6 mm, the light emergence surface 5E is a rectangle of 3.27×5.66 mm, and the length is 55 mm. By the light incidence surface 5I being a square, the direction difference in the change in the quantity of incident light by the aforedescribed arc jump is reduced.

Here, when the height and width of the light incidence surface of the integrator 5 used are V and H, respectively, it is preferable to satisfy the following condition:

$$0.7 < V/H < 1.43 \quad (5)$$

If the height/width ratio V/H of the light incidence surface 5I deviates from conditional expression (5), that is, greatly deviates from 1, the change in the quantity of incident light onto the light incidence surface 5I by arc jump in a direction of narrow width H will become great, and this is not preferable. By making the light emergence surface 5E similar in shape to the image display portion of the liquid crystal display element such as a liquid crystal panel, the illuminating efficiency can be improved. The area of the light incidence surface 5I of this integrator 5 is 21.16 mm², and the area of the light emergence surface 5E thereof is 18.51 mm². The area of the light incidence surface 5I is larger than the area of the light emergence surface 5E, and the area ratio therebetween is 0.875.

When the maximum cross-sectional areas of the light incidence surface 5I and the light emergence surface 5E in a direction perpendicular to the optical axis of the illuminating system are SI and SE, respectively, the following condition is satisfied:

$$0.5 < SE/SI < 1 \quad (6)$$

Conditional expression (6) prescribes the area ratio between the light incidence surface and the light emergence surface of the integrator 5, and in a range smaller than the range of conditional expression (6), the light emergence surface will become small but the angle of the emergent ray will become great and therefore the illuminating efficiency will be reduced, and this is not preferable, and in a range greater than the range of conditional expression (6), the light emergence surface will become too large and therefore the illuminance of the light emergence surface will be reduced, and this is not good.

The integrator 30 of Modification 2 of FIGS. 19A, 19B, 19C and 19D is such that the light incidence surface 30I thereof is a regular hexagon having a maximum width (outer diameter) of 6 mm, the light emergence surface 30E thereof is a rectangle of 3.27×5.66 mm and the length thereof is 55 mm. The light incidence surface 30I is made into a regular hexagon to thereby reduce the direction difference in the change in the quantity of incident light by the aforementioned arc jump. The ratio between the minimum width (diameter) $W_{min}$ and the maximum width (diameter) $W_{max}$ of the light incidence surface 30I is 0.866. Here, when the light incidence surface and the light emergence surface are 2n (n being such an integer that $3 \leq n \leq 6$) squares, the minimum width $W_{min}$ and the maximum width $W_{max}$ of the 2n square satisfy the condition that $$0.7 < W_{min}/W_{max} < 1 \quad (7).$$

Conditional expression (7) prescribes the ratio between the minimum width and the maximum width of the 2n square when the light incidence surface 30I of the integrator 30 is 2n square when n is 3 or greater integer, and outside the range of conditional expression (7), the direction difference in the quantity of incident light by arc jump becomes great, and this is not good.

Also, the light emergence surface 30E is made into a shape similar to that of the image display portion of the image display element such as a liquid crystal panel to thereby improve the illuminating efficiency. The area of the light incidence surface 30I is 23.38 mm², the area of the light emergence surface 30E is 18.5 mm², and the area of the light incidence surface 30I is larger than the area of the light emergence surface 30E, and the ratio therebetween is 0.792.

In the integrator 31 of Modification 3 of FIGS. 20A, 20B, 20C and 20D, the light incidence surface 31I thereof is a regular octagon having a maximum width of 6 mm, the light emergence surface 31E thereof is a rectangle of 3.27×5.66 mm, and the length thereof is 55 mm. Here, the light incidence surface 31I is made into a regular octagon to thereby reduce the change in the quantity of incident light by the aforementioned arc jump. The ratio between the minimum width (diameter) $W_{min}$ and the maximum width (diameter) $W_{max}$ of the light incidence surface 31I is 0.924. The light emergence surface 31E is made into a shape similar to that of the image display portion of the image display element such as a liquid crystal panel to thereby improve the illuminating efficiency. The area of the light incidence surface 31I is 25.46 mm², the area of the light emergence surface 31E is 18.51 mm², and the area of the light incidence surface 31I is larger than the area of the light emergence surface 31E, and the ratio therebetween is 0.727.

The integrator shown in this application assumes one of the several shapes as described above to thereby reduce the direction difference in the change in the quantity of incident light by arc jump and obtain high illuminating efficiency.

FIGS. 21A, 21B, 21C and 21D are schematic views of the essential portions of a holding mechanism for the integrator in the present eighth embodiment. In the present embodiment, the holding mechanism 115 for the integrator 5 is of a shape as shown in FIGS. 21A to 21D, and has an aperture 115b for fitting the meniscus lens 3 therein on the light incidence side of the integrator 5, a cut-away 115d toward the left of the center of the plane of the drawing sheet of FIGS. 21A to 21D, a cut-away 115c on the light emergence side, and an aperture 115a into which is inserted the tip end portion 116b of the keep spring 116 of the integrator 5, and the integrator 5 is fitted in the cut-aways 115c and 115d of the holding member 115, and the meniscus lens 3 is fitted in the aperture 115a in the holding member 115 and is fixed by a keep metal fitting 117, a screw 118 and a keep spring 116 for the integrator incorporating a transparent plane parallel plate 50 therein. The chamfered portion of the flat surface of the meniscus lens 3 is in contact with the corners of the light incidence surface 51 of the integrator 5 and keeps the integrator 5.

Figure 22:
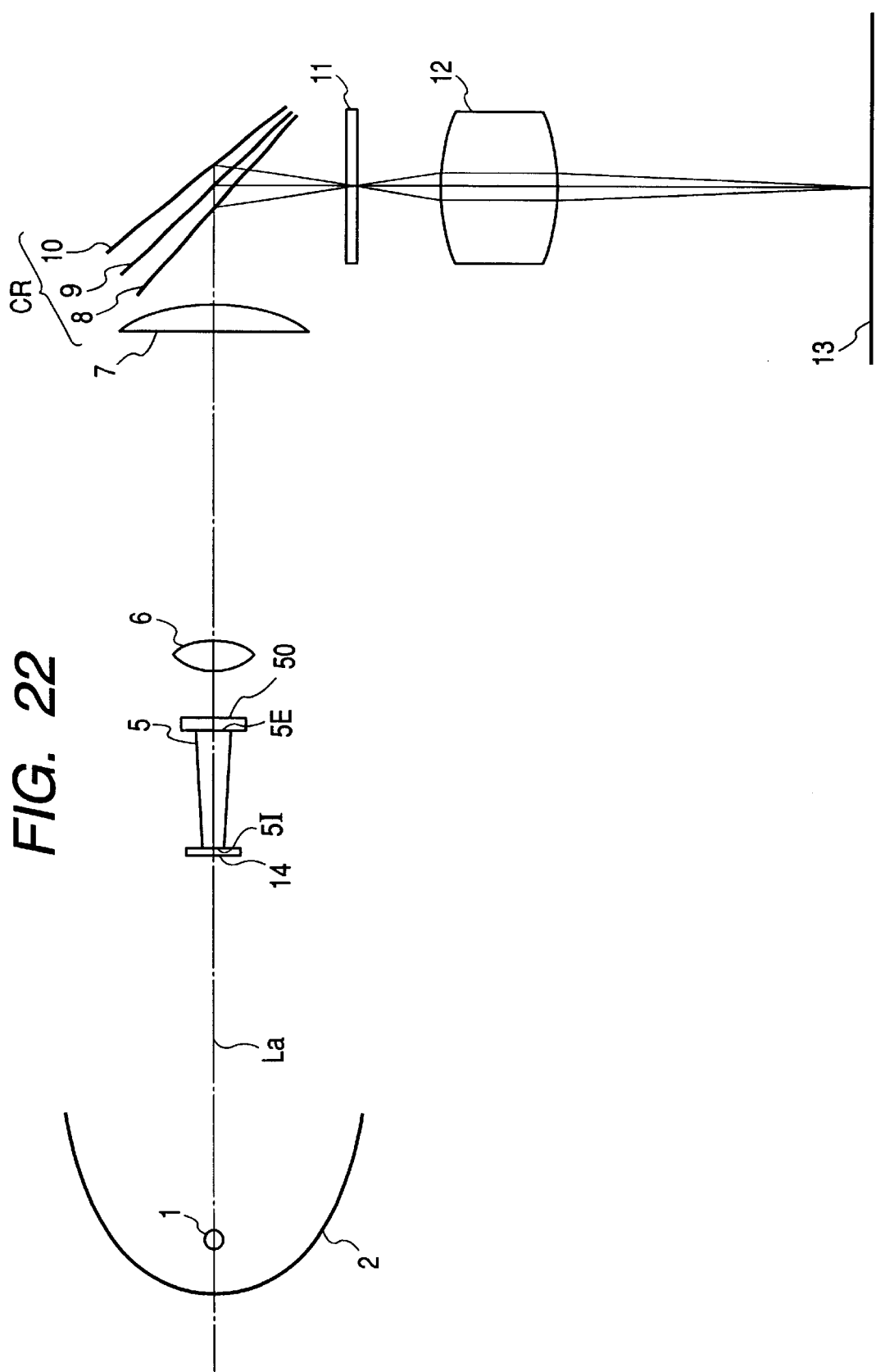
FIG. 22 is a schematic view of the essential portions of a ninth embodiment of the present invention.
Figure 23:
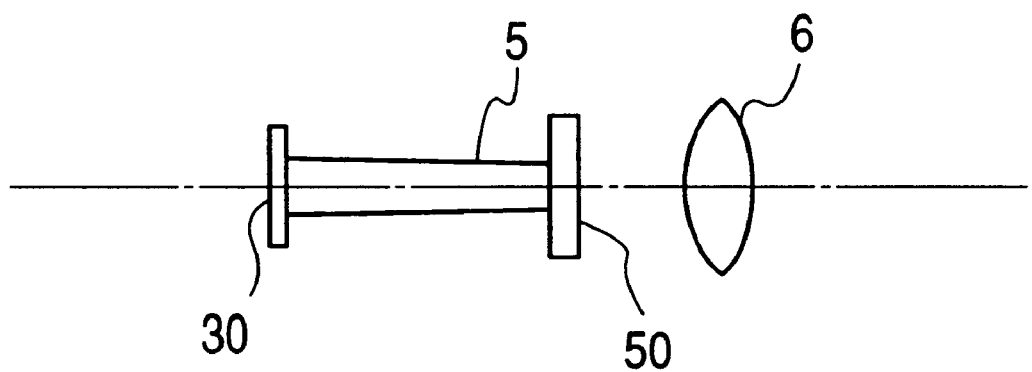
FIG. 23 is an illustration of a portion of a cross-section perpendicular to the plane of the drawing sheet of FIG. 22.
Figure 24D:
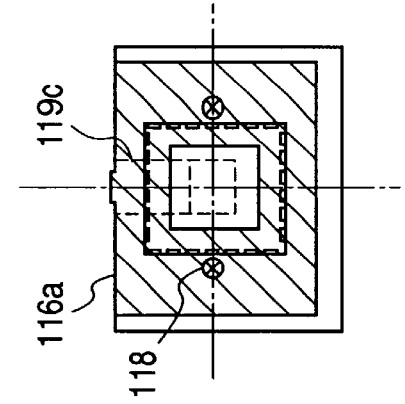
FIGS. 24A, 24B, 24C and 24D are schematic views of the essential portions of a holding mechanism for the integrator of FIG. 22.
Figure 24A:
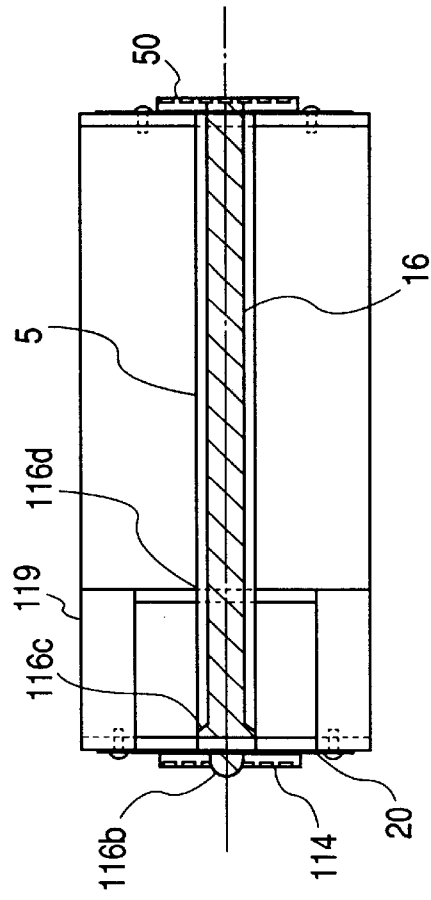
Figure 24C:
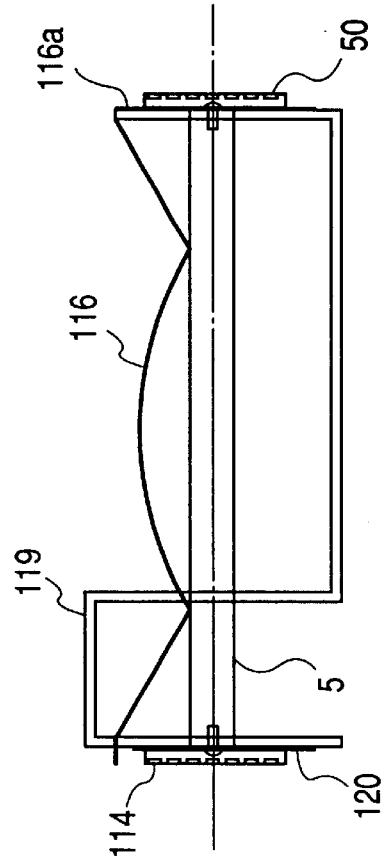
Figure 24B:
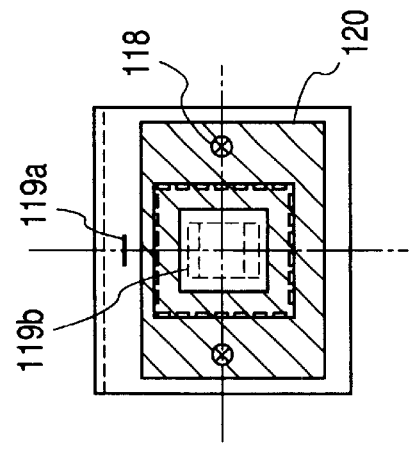

FIG. 22 is a schematic view of the essential portions of a ninth embodiment of the illuminating system and image projecting apparatus of the present invention, and FIG. 23 is a schematic view of a portion of FIG. 22 in a cross-section perpendicular to the plane of the drawing sheet of FIG. 22.

The present embodiment differs from the eighth embodiment of FIGS. 16 and 17 only in that a transparent plane parallel plate 14 is disposed instead of the meniscus lens 3 provided on the light incidence surface 5I of the integrator 5, and in the other points, the construction of the present embodiment is entirely the same as that of the eighth embodiment. Again in the present embodiment, the holding of the integrator 5 is done by the two transparent members 14 and 50 and therefore, any loss of the quantity of light does not occur.

FIGS. 24A, 24B, 24C and 24D are schematic views of the essential portions of a holding mechanism for the integrator in the ninth embodiment. The holding mechanism in the present embodiment differs from the holding mechanism of FIGS. 21A to 21D only in that instead of the meniscus lens, a plane parallel plate is held in contact with the light incidence surface of the integrator 5, and in the other points, the construction of the holding mechanism in the present embodiment is basically the same as that of the holding mechanism of FIGS. 21A to 21D. Also, as the integrators in the eighth and ninth embodiments, use can be made of integrators of the kaleidoscope type as in the first to seventh embodiments.

Also, according to the present invention, even if use is not made of a meniscus lens convex toward the light source, the shape of the integrator is set as previously described and the size of the light incidence surface thereof is made larger than the expause of the image of the light source (the image of the light emitting portion) by arc jump to thereby reduce the fluctuation of the quantity of incident light by arc jump, and both of the light incidence surface and light emergence surface of the bar-like integrator are held by transparent support members, whereby the loss of the quantity of incident light and the quantity of emergent light regarding the bar-like integrator can be reduced.

What is claimed is:

1. A light source device having a light source and condensing means for converging the light from said light source, said condensing means being provided with a meniscus lens convex toward said light source side in the optical path of the convergent light, wherein said meniscus lens satisfies the following conditional expressions:

0.5<D1/R1<2

0.2<R2/R1<2, where R1 represents the radius of curvature of the light source side lens surface of said meniscus lens, R2 represents the radius of curvature of that lens surface of said meniscus lens which is opposite to said light source, and D1 represents the on-axis thickness of said meniscus lens.

2. A light source device according to claim 1, wherein said condensing means forms the image of said light source, and said meniscus lens is located near the image of said light source.

3. A light source device according to claim 1, wherein said condensing means is provided with an elliptical mirror, said light source is disposed at a first focal point of said elliptical mirror, and said image of the light source is formed at a second focal point of said elliptical mirror.

4. A light source device according to claim 1, wherein said condensing means is provided with a parabolic surface mirror and a positive lens for condensing the light from said parabolic surface mirror, said light source is disposed at the focal point position of said parabolic surface mirror, and the image of said light source is formed at the focal point position of said positive lens.

5. A light source device according to claim 1, wherein said condensing means is provided with a spherical mirror and a positive lens for condensing the light from said spherical mirror, said light source is disposed at the central position of the curvature of said spherical mirror, one conjugate point of said positive lens is set at said central position of the curvature, and said image of the light source is formed at the other conjugate point of said positive lens.

6. A light source device according to claim 1, further having a bar-like integrator on or near the light incidence surface of which is formed the image of said light source, and wherein the light from the image of said light source is caused to enter the interior of said bar-like integrator, and the light is directed to the light emergence surface of said bar-like integrator while being reflected in the interior of said bar-like integrator, thereby forming on the light emergence surface a surface light source of which the intensity distribution has been uniformized.

7. A light source device according to claim 6, wherein the shape of a cross-section of said bar-like integrator which is orthogonal to the optical axis thereof is a polygon.

8. A light source device according to claim 7, wherein the shape of the cross-section of said bar-like integrator which is orthogonal to the optical axis thereof is a square or a hexagon.

9. A light source device according to any one of claims 6 through 8, wherein said bar-like integrator is bar-like glass.

10. A light source device according to claim 6, wherein said bar-like integrator is a kaleidoscope.

11. A light source device according to claim 1, wherein said light source comprises a high pressure mercury lamp.

12. A light source device according to claim 1, satisfying the following conditions:

0.65<D1/R1<1.6

0.3<R2/R1<1.4.

13. A light source device according to claim 1, wherein said light source is a high pressure mercury lamp.

14. A light source device according to claim 1, wherein said condensing means is provided with only one meniscus lens.

15. A light source device according to claim 1, wherein a side of said meniscus lens forms a conical shape of which the diameter gradually becomes larger toward said light source side.

16. A light source device according to claim 1, wherein at least one of the two lens surfaces of said meniscus lens comprises an aspherical surface.

17. A light source device according to claim 1, wherein the image of said light source is formed in one of interior or exterior of said meniscus lens.

18. A light source device having an imaging optical system for forming the image of a light source, and correcting means for decreasing at least one of displacement and expause of the image of said light source by at least one of displacement and expause of the light emitting portion of said light sources wherein said correcting means has a meniscus lens convex toward said light source side, said meniscus lens being provided in the optical path of convergent light by said imaging optical system, and wherein said meniscus lens satisfies the following conditional expressions:

0.5<D1/R1<2

0.2<R2/R1<2, where R1 represents the radius of curvature of the light source side lens surface of said meniscus lens, R2 represents the radius of curvature of that lens surface of said meniscus lens which is opposite to said light source, and D1 represents the on-axis thickness of said meniscus lens.

19. A light source device according to claim 18, wherein said meniscus lens is provided near the image of said light source.

20. A light source device according to claim 18, wherein said imaging optical system is provided with an elliptical mirror, said light source is disposed at a first focal point of said elliptical mirror, and the image of said light source is formed at a second focal point of said elliptical mirror.

21. A light source device according to claim 18, wherein said imaging optical system is provided with a parabolic surface mirror and a positive lens for condensing the light from said parabolic surface mirror, said light source is provided at the focal point position of said parabolic surface mirror, and the image of said light source is formed at the focal point position of said positive lens.

22. A light source device according to claim 18, wherein said imaging optical system is provided with a spherical mirror and a positive lens for condensing the light from said spherical mirror, said light source is disposed at the central portion of the curvature of said spherical mirror, one conjugate point of said positive lens is set at said central position of said curvature, and the image of the light source is formed at the other conjugate point of said positive lens.

23. A light source device according to claim 18, further having a bar-like integrator on or near the light incidence surface of which is formed the image of said light source, and wherein the light from the image of said light source is caused to enter the interior of said bar-like integrator, and the light is directed to the light emergence surface of said bar-like integrator while being reflected in the interior of said bar-like integrator, thereby forming on the light emergence surface a surface light source of which the intensity distribution has been uniformized.

24. A light source device according to claim 23, wherein the shape of a cross-section of said bar-like integrator which is orthogonal to the optical axis thereof is a polygon.

25. A light source device according to claim 24, wherein the shape of the cross-section of said bar-like integrator which is orthogonal to the optical axis thereof is a square or a hexagon.

26. A light source device according to claim 23, wherein said bar-like integrator is bar-like glass.

27. A light source device according to claim 23, wherein said bar-like integrator is a kaleidoscope.

28. A light source device according to claim 18, wherein said light source comprises a high Pressure mercury lamp.

29. A light source device according to claim 18, satisfying the following conditions:

$0.65<D1/R1<1.6$ $0.3<R2/R1<1.4.$

30. A light source device according to any one of claims 18 and 20 through 29, wherein said light source is a high pressure mercury lamp.

31. A light source device according to any one of claims 18 and 20 through 29, wherein said correcting means is provided with only one meniscus lens.

32. A light source device according to claim 18, wherein a side of said meniscus lens forms a conical shape of which the diameter gradually becomes larger toward the light source side.

33. A light source according to claim 18, wherein at least one of the two lens surfaces of said meniscus lens comprises an aspherical surface.

34. A light source device according to claim 18, wherein the image of said light source is formed in the interior or exterior of said meniscus lens.

35. A light source device according to claim 18, wherein said light emitting portion of said light source is displaced in a direction orthogonal to an optical axis of said light source device, and said correcting means decreases at least one of the displacement and the expause of the image of said light source by the displacement.

36. A light source device having (a) a light source comprising a high pressure mercury lamp and (b) condensing means for converging the light from said light source, said condensing means being provided with a meniscus lens convex toward said light source side in the optical path of the convergent light, wherein a side of said meniscus lens forms a conical shape whose diameter gradually becomes larger toward the light source side.

37. An illuminating system having a light source device according to any one of claims 1 through 8, 10 through 29, and 32 through 35, and an irradiating optical system for applying a light beam from said light source device to a surface to be illuminated, said light source device having a bar-like integrator on or near the light incidence surface of which is formed the image of said light source, and wherein the light from said image of said light source is caused to enter the interior of said bar-like integrator, and the light is, directed to the light emergence surface of said bar-like integrator while being reflected in the interior of said bar-like integrator, whereby when a surface light source of which the intensity distribution has been uniformized is to be formed on said light emergence surface, said irradiating optical system images said light emergence surface of said integrator on or near said surface to be illuminated.

38. A light source device having (a) an imaging optical system for forming the image of a light source, the light source comprising a high pressure mercury lamp, and p,) correcting means for decreasing at least one of displacement and expause of the image of said light source by at least one of displacement and expause of the light emitting portion of said light source, wherein a side of said meniscus lens forms a conical shape whose diameter gradually becomes larger toward the light source side.

39. A light source device having (a) an imaging optical system for forming the image of a light source the light source comprising a high pressure mercury lamp, and (b) correcting means for decreasing at least one of displacement and expause of the image of said light source by at least one of displacement and expause of the light emitting portion of said light source, wherein said light emitting portion of said light source is displaced in a direction orthogonal to an optical axis of said light source device, and said correcting means decreases at least one of the displacement and the expause of the image of said light source by the displacement.

40. An illumination apparatus in which light from a light source is introduced into a bar-like optical transmission member, the internal surface of which comprises a reflection surface and the light from the light source is multi-reflected at the inside of said optical transmission member so that the light has a uniform intensity distribution in an exit surface of said optical transmission member, and the light having the uniform intensity distribution is projected onto a surface to be illuminated, wherein the light source has a lamp having a potential arc jump, and said optical transmission member is constructed such that a maximum cross-sectional area of the light incident surface is larger than a maximum cross-sectional area of the light exit surface and the shape of the light incident surface is a square or a 2n regular polygon (n is an integer and $3 \leq n \leq 6$). wherein the following condition is satisfied:

$0.5<SE/SI<1,$ where SI represents the maximum cross-sectional area of the light incident surface and SE represents the maximum cross-sectional area of the light exit surface.

41. An illumination apparatus in which light from a light source is introduced into a bar-like optical transmission member, the internal surface of which comprises a reflection surface, and wherein the light from the light source is multi-reflected at the inside of said optical transmission member so that the light has a uniform intensity distribution in an exit surface of said optical transmission member, and the light having the uniform intensity distribution is projected onto a surface to be illuminated, wherein the light source comprises a lamp having a potential arc jump, and wherein a meniscus lens, an outer size of which is larger than an incident surface of said optical transmission member, is mounted on the light incident surface of said optical transmission member such that the meniscus lens is convex toward the light source, and the meniscus lens supports the light incident surface side of said optical transmission member.

42. An illumination apparatus according to claim 41, wherein the following condition is satisfied:

$0.5<SE/SI<1,$ where SI represents the maximum cross-sectional area of the light incident surface and SE represents the maximum cross-sectional area of the light exit surface.

43. An illumination apparatus according to claim 41, wherein said optical transmission member comprises an optical member, and the light from the light source is totally reflected by a side surface in the internal surface of said optical member.

44. An illumination apparatus in which light from a light source is introduced into a bar-like optical transmission member, the internal surface of which comprises a reflection surface, and wherein the light from the light source is multi-reflected at the inside of said optical transmission member so that the light has a uniform intensity distribution in an exit surface of said optical transmission member, and the light having the uniform intensity distribution is projected onto a surface to be illuminated.

wherein the light source comprises a lamp having a potential arc jump, and wherein a meniscus lens, an outer size of which is larger than an incident surface of said optical transmission member, is mounted on the light incident surface of said optical transmission member such that the meniscus lens is convex toward the light source, and the meniscus lens supports the light incident surface side of said optical transmission member, wherein the light incident surface is a 2n regular polygon (n is an integer and 3≦n≦6), and the following condition is satisfied:

$$0.7 < W_{min}/W_{max} < 1,$$

wherein $W_{min}$ represents a minimum width of the 2n regular polygon and $W_{max}$ represents a maximum width of the 2n regular polygon.

45. An illumination apparatus in which light from a light source is introduced into a bar-like optical transmission member, the internal surface of which comprises a reflection surface, and wherein the light from the light source is multi-reflected at the inside of said optical transmission member so that the light has a uniform intensity distribution in an exit surface of said optical transmission member, and the light having the uniform intensity distribution is projected onto a surface to be illuminated, wherein the light source comprises a lamp having a potential arc jump, and wherein a meniscus lens, an outer size of which is larger than an incident surface of said optical transmission member, is mounted on the light incident surface of said optical transmission member such that the meniscus lens is convex toward the light source, and the meniscus lens supports the light incident surface side of said optical transmission member, wherein a transparent plane-parallel plate or a transparent lens, an outer size of which is larger than the light exit surface, is mounted on the light exit surface of said optical transmission member, and the plane-parallel plate or lens supports the light exit surface side of said optical transmission member.

46. A liquid crystal projector wherein a liquid crystal panel is illuminated by an illumination apparatus according to claim 37.

47. A liquid crystal projector wherein a liquid crystal panel is illuminated by an illumination apparatus according to claim 41.

48. A liquid crystal projector wherein a liquid crystal panel is illuminated by an illumination apparatus according to claim 40 or 42.

49. A liquid crystal projector wherein a liquid crystal panel is illuminated by an illumination apparatus according to claim 43.

50. A liquid crystal projector wherein a liquid crystal panel is illuminated by an illumination apparatus according to claim 44.

51. A liquid crystal projector wherein a liquid crystal panel is illuminated by an illumination apparatus according to claim 45.

52. A liquid crystal projector according to claim 46, wherein in said illumination apparatus, the light from said optical transmission member is condensed by a lens system to be incident on a color separation system by which the light is separated into a plurality of color lights with which said liquid crystal panel is illuminated.

53. A liquid crystal projector according to claim 47, wherein in said illumination apparatus, the light from said optical transmission member is condensed by a lens system to be incident on a color separation system by which the light is separated into a plurality of color lights with which said liquid crystal panel is illuminated.

54. A liquid crystal projector according to claim 48, wherein in said illumination apparatus, the light from said optical transmission member is condensed by a lens system to be incident on a color separation system by which the light is separated into a plurality of color lights with which said liquid crystal panel is illuminated.

55. A liquid crystal projector according to claim 49, wherein in said illumination apparatus, the light from said optical transmission member is condensed by a lens system to be incident on a color separation system by which the light is separated into a plurality of color lights with which said liquid crystal panel is illuminated.

56. A liquid crystal projector according to claim 50, wherein in said illumination apparatus, the light from said optical transmission member is condensed by a lens system to be incident on a color separation system by which the light is separated into a plurality of color lights with which said liquid crystal panel is illuminated.

57. A liquid crystal projector according to claim 51, wherein in said illumination apparatus, the light from said optical transmission member is condensed by a lens system to be incident on a color separation system by which the light is separated into a plurality of color lights with which said liquid crystal panel is illuminated.

58. An illumination apparatus in which light from a light source is introduced into a bar-like optical transmission member, the internal surface of which comprises a reflection surface and the light from the light source is multi-reflected at the inside of said optical transmission member so that the light has a uniform intensity distribution in an exit surface of said optical transmission member, and the light having the uniform intensity distribution is projected onto a surface to be illuminated, wherein the light source has a lamp having a potential arc jump, and said optical transmission member is constructed such that a maximum cross-sectional area of the light incident surface is larger than a maximum cross-sectional area of the light exit surface and the shape of the light incident surface is a square or a 2n regular polygon (n is an integer and 3≦n≦6), and wherein the light incident surface is a 2n regular polygon (n is an integer and 3≦n≦6), and the following condition is satisfied:

$$0.7 < W_{min}/W_{max} < 1,$$

wherein $W_{min}$ represents a minimum width of the 2n regular polygon and $W_{max}$ represents a maximum width of the 2n regular polygon.

59. An illumination apparatus in which light from a light source is introduced into a bar-like optical transmission member, the internal surface of which comprises a reflection surface and the light from the light source is multi-reflected at the inside of said optical transmission member so that the light has a uniform intensity distribution in an exit surface of said optical transmission member, and the light having the uniform intensity distribution is projected onto a surface to be illuminated, wherein the light source has a lamp having a potential arc jump, and said optical transmission member is constructed such that a maximum cross-sectional area of the light incident surface is larger than a maximum cross-sectional area of the light exit surface and the shape of the light incident surface is a square or a 2n regular polygon (n is an integer and $3 \leqq n \leqq 6$), and wherein a transparent plane-parallel plate or a transparent lens, an outer size of which is larger than the light exit surface, is mounted on the light exit surface of said optical transmission member, and the plane-parallel plate or lens supports the light exit surface side of said optical transmission member.

\* \* \* \* \*

UNITED STATES PATENT AND TRADEMARK OFFICE
CERTIFICATE OF CORRECTION

PATENT NO.   : 6,231,193 B1
DATED        : May 15, 2001
INVENTOR(S)  : Saburo Sugawara It is certified that error appears in the above-identified patent and that said Letters Patent is hereby corrected as shown below:

<u>Title page,</u>
Item [56], References Cited, under OTHER PUBLICATIONS, "Nov. 5, 1991), Aug. 6, 1991" should read -- Aug. 6. 1991), Nov. 5, 1991 --.

<u>Column 5,</u>
Line 13, "described" should read -- described as --.

<u>Column 8,</u>
Line 3, "SE" should read -- 5E --.

<u>Column 9,</u>
Line 31, "construded" should read -- constructed --.

<u>Column 14,</u>
Line 50, "51" should read -- 5I --.
Line 52, "51" should read -- 5I --.
Line 60, "51" should read -- 5I --.

<u>Column 15,</u>
Line 42, "301" should read -- 30I --.

<u>Column 18,</u>
Line 5, "one of" should read -- the --.
Line 12, "sources" should read -- source, --.

<u>Column 19,</u>
Line 6, "Pressure" should read -- pressure --.
Line 51, "is," should read -- is --.
Line 61, "p,)" should read -- b) --.

UNITED STATES PATENT AND TRADEMARK OFFICE
CERTIFICATE OF CORRECTION

PATENT NO. : 6,231,193 B1
DATED : May 15, 2001
INVENTOR(S) : Saburo Sugawara

It is certified that error appears in the above-identified patent and that said Letters Patent is hereby corrected as shown below:

Column 20,
Line 2, "source" should read -- source, --.
Line 28, ". wherein" should read -- , wherein --.

Signed and Sealed this

Thirtieth Day of July, 2002

Attest:

Attesting Officer

JAMES E. ROGAN
Director of the United States Patent and Trademark Office